US010935169B2

(12) United States Patent
Kuwajima et al.

(10) Patent No.: US 10,935,169 B2
(45) Date of Patent: Mar. 2, 2021

(54) FIBER-REINFORCED COMPOSITE MATERIAL, LAMINATE, PIPE, RISER PIPE, AND FLOW LINE

(71) Applicant: DAIKIN INDUSTRIES, LTD., Osaka (JP)

(72) Inventors: Yuuki Kuwajima, Osaka (JP); Hayato Tsuda, Osaka (JP); Takeshi Inaba, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 156 days.

(21) Appl. No.: 16/097,855

(22) PCT Filed: Apr. 11, 2017

(86) PCT No.: PCT/JP2017/014783
§ 371 (c)(1),
(2) Date: Oct. 31, 2018

(87) PCT Pub. No.: WO2017/191735
PCT Pub. Date: Nov. 9, 2017

(65) Prior Publication Data
US 2019/0137012 A1    May 9, 2019

(30) Foreign Application Priority Data

May 2, 2016    (JP) .............................. JP2016-092690
Jun. 28, 2016    (JP) .............................. JP2016-127650

(51) Int. Cl.
| F16L 11/10 | (2006.01) |
| B32B 1/08 | (2006.01) |
| C08J 5/04 | (2006.01) |
| B32B 27/30 | (2006.01) |
| B32B 27/32 | (2006.01) |
| C08J 5/24 | (2006.01) |
| C08K 3/04 | (2006.01) |
| C08K 7/06 | (2006.01) |

(52) U.S. Cl.
CPC ................ *F16L 11/10* (2013.01); *B32B 1/08* (2013.01); *B32B 27/304* (2013.01);
(Continued)

(58) Field of Classification Search
CPC ........... Y10T 428/139; Y10T 428/1393; F16L 11/081; F16L 11/10; C08F 14/04;
(Continued)

(56) References Cited

U.S. PATENT DOCUMENTS

| 5,071,338 A | 12/1991 | Dublinski et al. |
| 5,217,669 A | 6/1993 | Dublinski et al. |
(Continued)

FOREIGN PATENT DOCUMENTS

| JP | 61-061849 A | 3/1986 |
| JP | 64-069637 A | 3/1989 |
(Continued)

OTHER PUBLICATIONS

International Search Report for PCT/JP2017/014783 dated Jul. 18, 2017 [PCT/ISA/210].
(Continued)

*Primary Examiner* — Camie S Thompson
(74) *Attorney, Agent, or Firm* — Sughrue Mion, PLLC

(57) ABSTRACT

Provided is a fiber-reinforced composite material having a greater maximum stress, maximum elongation, and tensile modulus, which are determined by a tensile test, than conventional fiber-reinforced composite materials containing a fluororesin as a matrix. The invention relates to a fiber-reinforced composite material including a fluororesin and a reinforcing fiber, the fluororesin containing a tetrafluoroethylene unit and a vinylidene fluoride unit, the tetrafluoroethylene unit representing 55 to 95 mol % of all the monomer units constituting the fluororesin, the vinylidene fluoride unit representing 45 to 5 mol % of all the monomer units constituting the fluororesin.

19 Claims, 4 Drawing Sheets

(52) U.S. Cl.
CPC ............... *B32B 27/322* (2013.01); *C08J 5/04* (2013.01); *C08J 5/042* (2013.01); *C08J 5/24* (2013.01); *C08K 3/04* (2013.01); *C08K 7/06* (2013.01); *B32B 2597/00* (2013.01); *C08J 2327/18* (2013.01)

(58) Field of Classification Search
CPC ...... C08F 14/26; C08F 214/18; C08F 214/22; C08F 214/225; C08F 214/26; C08F 214/265; C08J 2327/18; C08J 5/04; C08J 5/042; C08J 5/24; B32B 1/08; B32B 2597/00; B32B 27/04; B32B 27/304; B32B 27/322; C08K 7/06; C08K 3/04
USPC .... 428/36.9, 36.91; 526/247, 249, 254, 255, 526/253; 138/137, 140
See application file for complete search history.

(56) References Cited

U.S. PATENT DOCUMENTS

| | | | |
|---|---|---|---|
| 6,016,845 | A | 1/2000 | Quigley et al. |
| 2007/0275225 | A1 | 11/2007 | Devic et al. |
| 2010/0300570 | A1* | 12/2010 | Witz .................... F16L 9/12 138/137 |
| 2012/0015124 | A1 | 1/2012 | Kitahara et al. |
| 2017/0307113 | A1 | 10/2017 | Murakami et al. |
| 2018/0072829 | A1* | 3/2018 | Amin-Sanayei ...... C08F 114/22 |

FOREIGN PATENT DOCUMENTS

| | | |
|---|---|---|
| JP | 2001-505281 A | 4/2001 |
| JP | 2007-517100 A | 6/2007 |
| JP | 2007-314720 A | 12/2007 |
| WO | 97/12166 A1 | 4/1997 |
| WO | 2010/110129 A1 | 9/2010 |
| WO | 2016/060010 A1 | 4/2016 |

OTHER PUBLICATIONS

International Preliminary Report on Patentability with English Translation of the Written Opinion of PCT/JP2017/014783 dated Nov. 6, 2018.
Communication dated Nov. 20, 2019 from European Patent Office in counterpart EP Application No. 17792668.0.

* cited by examiner

FIBER-REINFORCED COMPOSITE MATERIAL, LAMINATE, PIPE, RISER PIPE, AND FLOW LINE

CROSS REFERENCE TO RELATED APPLICATIONS

This application is a National Stage of International Application No. PCT/JP2017/014783, filed on Apr. 11, 2017, which claims priority from Japanese Patent Application No. 2016-092690, filed on May 2, 2016, and Japanese Patent Application No. 2016-127650, filed on Jun. 28, 2016.

TECHNICAL FIELD

The invention relates to fiber-reinforced composite materials, laminates, pipes, riser pipes, and flowlines.

BACKGROUND ART

Known fiber-reinforced composite materials containing a fluoropolymer as a matrix are as follows.

Patent Literature 1 discloses an incombustible sheet in which a fluororesin film is melt-stuck to at least one surface of an incombustible base fabric made of an incombustible fiber fabric.

Patent Literature 2 discloses a reusable flexible tool particularly adapted for molding composite materials, the tool including a fluoroelastomer-impregnated polyaramid fiber sandwiched between unreinforced fluoroelastomer sheets.

Patent Literature 3 discloses a reinforced fluoropolymer plate including a layer of fluoropolymer on one of its faces, and a sheet of carbon fibers on the other face, at least part of the sheet of carbon fibers being impregnated with a fluoropolymer.

Patent Literature 4 discloses a glass fiber-reinforced composite material including the following fluorine-containing copolymer (F) and glass fiber (G).

The fluorine-containing copolymer (F) includes (a) repeating unit based on tetrafluoroethylene and/or chlorotrifluoroethylene, (h) a repeating unit based on a fluorine monomer (excluding tetrafluoroethylene and chlorotrifluoroethylene), and (c) a repeating unit based on a monomer having an acid anhydride residue and a polymerizable unsaturated bond, the repeating unit (a) being present in an amount of 50 to 99.89 mol %, the repeating unit (b) being present in an amount of 0.1 to 49.99 mol %, and the repeating unit (c) being present in an amount of 0.01 to 5 mol % in the total amount of 100 mol % of the repeating units (a) to (c).

CITATION LIST

Patent Literature

Patent Literature 1: JP S61-61849 A
Patent Literature 2: JP S64-69637 A
Patent Literature 3: JP 2007-517100 T
Patent Literature 4: JP 2007-314720 A

SUMMARY OF INVENTION

Technical Problem

The invention aims to provide a fiber-reinforced composite material having a greater maximum stress, maximum elongation, and tensile modulus, which are determined by a tensile test, than conventional fiber-reinforced composite materials containing a fluororesin as a matrix.

Solution to Problem

The invention relates to a fiber-reinforced composite material including a fluororesin and a reinforcing fiber, the fluororesin containing a tetrafluoroethylene unit and a vinylidene fluoride unit,
the tetrafluoroethylene unit representing 55 to 95 mol % of all the monomer units constituting the fluororesin, the vinylidene fluoride unit representing 45 to 5 mol % of all the monomer units constituting the fluororesin.

Preferably, the fluororesin further contains at least one unit of an ethylenically unsaturated monomer selected from the group consisting of:
ethylenically unsaturated monomers represented by the following formula (1):

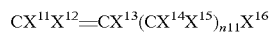

wherein $X^{11}$ to $X^{16}$ are the same as or different from each other, and are each H, F, or Cl; and $n^{11}$ is an integer of 0 to 8, excluding tetrafluoroethylene and vinylidene fluoride; and
ethylenically unsaturated monomers represented by the following formula (2):

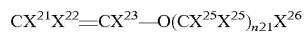

wherein $X^{21}$ to $X^{26}$ are the same as or different from each other, and are each H, F, or Cl; and $n^{21}$ is an integer of 0 to 8.

Preferably, the fluororesin and the reinforcing fiber have a mass ratio of 10:90 to 90:10.

Preferably, the fiber-reinforced composite material has a maximum stress of 50 MPa or greater.

Preferably, the fiber-reinforced composite material has a maximum elongation of 1% or greater.

Preferably, the fiber-reinforced composite material has a tensile modulus of 1000 MPa or greater.

Preferably, the reinforcing fiber is in the form of a sheet.

Preferably, the reinforcing fiber is a reinforcing fiber woven fabric.

Preferably, the reinforcing fiber is at least one selected from the group consisting of carbon fiber, glass fiber, basalt fiber, metal fiber, aramid fiber, polyethylene fiber, polyamide fiber, silicon carbide fiber, polyester fiber, ceramic fiber, alumina fiber, boron fiber, mineral fiber, rock fiber, slag fiber, plant fiber, polyoxymethylene fiber, aromatic polyamide fiber, polyparaphenylene benzobisoxazole fiber, cellulose fiber, and lignin fiber.

Preferably, the reinforcing fiber has a tensile modulus of 100 to 1000 GPa.

Preferably, the reinforcing fiber has a tensile strength of 2000 to 10000 MPa.

Preferably, the fiber-reinforced composite material is a tape.

Preferably, the tape is a band-like article having flexibility that allows the tape to be coiled.

The invention also relates to a laminate including:
a first layer; and
a second layer disposed on the first layer,
the second layer including the fiber-reinforced composite material.

The invention also relates to a pipe including the laminate.

The invention also relates to a pipe including:
a first layer; and
a second layer disposed on the first layer, the second layer including the fiber-reinforced composite material, the first layer and the second layer being stacked in the given order from the inside of the pipe, the second layer being formed from the tape wrapped around the outer surface of the first layer.

Preferably, in the pipe, the first layer is a flexible tube.

The invention also relates to a riser pipe including the pipe.

The invention also relates to a flowline including the pipe.

Advantageous Effects of Invention

The fiber-reinforced composite materials of the invention having the above structures have a great maximum stress, a great maximum elongation, and a great tensile modulus.

DESCRIPTION OF EMBODIMENTS

Figure 1A:
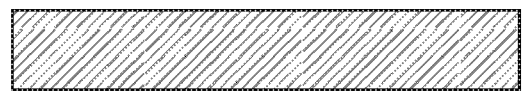
FIGS. 1(a) to 1(c) are schematic views of examples of the shape of a tape.

The invention will be specifically described hereinbelow.

The fiber-reinforced composite material of the invention contains a fluororesin and a reinforcing fiber.

The reinforcing fiber is preferably at least one selected from the group consisting of carbon fiber, glass fiber, basalt fiber, metal fiber, aramid fiber, polyethylene fiber, polyamide fiber, silicon carbide fiber, polyester fiber, ceramic fiber, alumina fiber, boron fiber, mineral fiber, rock fiber, slag fiber, plant fiber, polyoxymethylene fiber, aromatic polyamide fiber, polyparaphenylene benzobisoxazole fiber, cellulose fiber, and lignin fiber, more preferably at least one selected from the group consisting of carbon fiber, glass fiber, and aramid fiber, still more preferably carbon fiber.

The surface of the reinforcing fiber may be treated. It may be treated with a treating agent or a sizing agent, or may be plated with metal, for example.

Examples of the sizing agent include surfactants such as nonionic surfactants, anionic surfactants, and amphoteric surfactants, mineral oils, and animal and vegetable oils. Specific examples of the sizing agent include ester compounds, alkylene glycol compounds, polyolefin compounds, phenyl ether compounds, polyether compounds, silicone compounds, polyethylene glycol compounds, amide compounds, sulfonate compounds, phosphate compounds, carboxylate compounds, fluorine compounds, and any combination of two or more of these.

Examples of the treating agent include epoxy resin, urethane resin, silane coupling agents, water-insoluble polyamides, water-soluble polyamides, fluororesin, silicone resin, and any combination of two or more of these.

The use of the treating agent allows introduction of a functional group on the surface of the reinforcing fiber. The reinforcing fiber preferably has on its surface any of amide, carboxyl, acid anhydride, alkoxycarbonyl, cyano, carbonate, carboxylic acid halide, hydroxyl, glycidyl, imide, urethane, urea, sulfonyl, sulfo, epoxy, alkylene, hydrocarbon, halogen, N-oxide, N-hydroxy, nitro, nitroso, azo, diazo, azide, oxo, phenyl, phosphino, thio, S-oxide, thioxy, peroxy, ketone, acyl, acetyl, enol, enamine, formyl, benzoyl, acetal, hemiacetal, oxime, thiol, urea, isonitrile, allene, and thiol groups, and combination of two or more of these.

The reinforcing fiber preferably includes fibers having an average fiber length of 5 mm or longer, more preferably includes fibers having an average fiber length of 50 mm or longer, still more preferably includes fibers having an average fiber length of 100 mm or longer. Most preferably, the reinforcing fiber is a continuous fiber.

The reinforcing fiber may be a combined filament yarn including a carbon fiber and a thermoplastic resin fiber (including a fluororesin fiber).

The reinforcing fiber may be in the form of a continuous fiber, long fiber, or short fiber, for example. Examples of the form of the reinforcing fiber include, but are not limited to, a unidirectional reinforcing fiber sheet including reinforcing fibers paralleled in one direction, a laminate of two or more unidirectional reinforcing fiber sheets stacked at different angles, two dimensionally and randomly oriented reinforcing fibers, fabric such as woven fabric, knitted fabric, or non-woven fabric formed from reinforcing fibers, and a strand such as a braid. These are sometimes referred to as, for example, filament, tow, staple yarn, woven fabric (cloth), braid, chopped yarn, milled, felt, mat, or paper. Two or more of these may be used in combination. In the case of a laminate, multiple layers are preferably stacked in different directions, alternately stacked, or symmetrically placed in the thickness direction. In order to achieve good tensile properties, the reinforcing fiber is preferably in the form of a sheet, more preferably in the form of a unidirectional reinforcing fiber sheet including fibers paralleled in one direction, woven fabric, or non-woven fabric, still more preferably in the form of a woven fabric.

When the reinforcing fiber is in the form of a sheet, the sheet preferably has a thickness of 0.01 to 5 mm, more preferably 0.05 to 2.5 mm, still more preferably 0.1 to 2 mm.

The reinforcing fiber sheet is preferably a carbon fiber sheet. Examples of the carbon fiber sheet include products of Toray Industries, Inc., such as CO6142, CO6151B, CO6343, CO6343B, CO6347B, CO6644B, CO1302, CO1303, CO5642, CO7354, CO7359B, CK6244C, CK6273C, CK6261C, UT70-20G, UT70-30G, UT70-40G, UT70-45G, UT70-60G, UM46-30G, UM46-34G, UM46-40G, BT70-20, and BT70-30, products of Mitsubishi Rayon Co., Ltd., such as TR3110M, TR3523M, TR6110HM, TR6120HM, TRK101M, TRK510M, TR3160TMS, TR3163TMS, TRK979PQRW, and TRK976PQRW, and products of Toho Tenax Co., Ltd., such as W-1103, W-1104, W-3101, W-310A, W-3104, W-3108, W-3101, W-3112, W-3121, W-3161, W-3162, W-6101, W-6110, W-6E01, W-7101, W-7161, W-7U61, W-3801, W-3802, W-3302, W-3303, and W-3304.

Examples of the carbon fiber include polyacrylonitrile-based, pitch-based, rayon-based, cellulose-based, lignin-based, and phenol-based carbon fibers, and vapor grown carbon fibers. Preferred are polyacrylonitrile-based, pitch-based, and rayon-based carbon fibers.

In particular, a polyacrylonitrile-based carbon fiber is preferably used in the invention because it has good tensile strength.

Examples of the polyacrylonitrile-based carbon fiber include products of Toray Industries, Inc., such as T300-

1000, T300-3000, 7300-6000, T300-12000, T300B-1000, T300B-3000, T300B-6000, T300B-12000, T400HB-3000, T400HB-6000, T700SC-12000, T700SC-24000, T800SC-24000, T800HB-6000, T800HB-12000, T830HB-6000, T1000GB-12000, T1100GC-12000, T1100GC-24000, M35JB-6000, M35JB-12000, M40JB-6000, M40JB-12000, M46JB-6000, M461E-12000, M50JB-6000, M55J-6000, M55JB-6000, M60JB-3000, M60JB-6000, and M30SC-18000, products of Mitsubishi Rayon Co., Ltd., such as TR30S3L, TR50S6L, TR50S12L, TR50S15L, TR50D12L, TRH50 18M, TRH50 60M, and TRW40 50L (HT series), MR60H242 (IM series), MS40 12M, HR40 12M, and HS40 12P (HM series), and 34-700 and 37-800 (HT series), and products of Toho Tenax Co., Ltd., such as HTA40, HTS40, HTS45, STS40, UTS50, IMS40, 1MS60, IMS65, HWA35, UMS40, UMS45, UMS55, and HTS40MC.

The tensile modulus of the reinforcing fiber (the tensile modulus of a single fiber) is preferably 100 to 1000 GPa, more preferably 200 to 500 GPa in order to further increase the maximum stress, the maximum elongation, and the tensile modulus of the fiber-reinforced composite material.

The tensile strength of the reinforcing fiber (the tensile strength of a single fiber) is preferably 2000 to 10000 MPa, more preferably 3000 to 8000 MPa in order to further increase the maximum stress, the maximum elongation, and the tensile modulus of the fiber-reinforced composite material.

When the polyacrylonitrile-based carbon fiber is used, the tensile modulus thereof is preferably 100 to 1000 GPa, more preferably 200 to 500 GPa in order to further increase the maximum stress, the maximum elongation, and the tensile modulus of the fiber-reinforced composite material. Also, the tensile strength thereof is preferably 2000 to 10000 MPa, wore preferably 3000 to 8000 MPa in order to further increase the maximum stress, the maximum elongation, and the tensile modulus of the fiber-reinforced composite material.

The tensile modulus and the tensile strength are determined in accordance with JIS R 7606 (2000).

The woven fabric may be a bidirectional woven fabric or a multi-axial woven fabric, for example.

The fiber-reinforced composite material of the invention contains a fluororesin as a matrix resin.

The fiber-reinforced composite material of the invention is preferably prepared by combining the film or powder of the fluororesin and the reinforcing fiber, more preferably prepared by combining a film or powder of the fluororesin and the reinforcing fiber sheet, still more preferably prepared by combining a film or powder of the fluororesin and the reinforcing fiber woven fabric of the reinforcing fiber.

The combining may be performed, for example, by molding the fluororesin into a film and then heat-pressing the film and the reinforcing fiber. The reinforcing fiber is preferably in the form of a sheet, more preferably in the form of a reinforcing fiber woven fabric. When the reinforcing fiber sheet or the reinforcing fiber woven fabric is used, the fluororesin film may be disposed on each surface of the reinforcing fiber and the materials may be combined by heat-pressing.

The film to be used in the combining may be obtained by molding the fluororesin by extrusion molding, press molding, or another method.

The film preferably has a maximum stress of 5 to 500 MPa, preferably 10 to 100 MPa.

The film preferably has a maximum elongation of 50% to 2000%, preferably 100% to 1000%.

The film preferably has a tensile modulus of 50 to 5000 MPa, preferably 100 to 1000 MPa.

The maximum stress, the maximum elongation, and the tensile modulus of the film and the fiber-reinforced composite material are determined by a tensile test under the following conditions.
Tensile Test Conditions
Tension rate: 100 mm/min
Shape of sample: micro dumbbell The maximum stress of the fiber-reinforced composite material of the invention is preferably twice or more, more preferably three times or more, still more preferably four times or more, most preferably five times or more the maximum stress of the film before combining. The upper limit of the maximum stress may be 1000 times the maximum stress of the film before combining.

The maximum stress of the fiber-reinforced composite material of the invention is preferably 50 MPa or greater, more preferably 100 MPa or greater, still more preferably 150 MPa or greater, most preferably 200 MPa or greater. The upper limit of the maximum stress may be 10000 MPa.

The maximum elongation of the fiber-reinforced composite material of the invention is preferably 1% or greater, more preferably 2% or greater, still more preferably 3% or greater, most preferably 3.5% or greater. The upper limit of the maximum elongation may be 100%.

The tensile modulus of the fiber-reinforced composite material of the invention is preferably twice or more, more preferably three times or more, still more preferably five times or more, most preferably eight times or more the tensile modulus of the film before combining. The upper limit of the tensile modulus may be 1000 times the tensile modulus of the film before combining.

The tensile modulus of the fiber-reinforced composite material of the invention is preferably 1000 MPa or greater, more preferably 2000 MPa or greater, still more preferably 3000 MPa or greater, most preferably 4000 MPa or greater. The upper limit of the tensile modulus may be 1000000 MPa.

The mass ratio between the fluororesin and the reinforcing fiber in the fiber-reinforced composite material is preferably 10:90 to 90:10, more preferably 20:80 to 80:20, still more preferably 30:70 to 70:30, most preferably 30:70 to 60:40 in order to further increase the maximum stress, the maximum elongation, and the tensile modulus of the fiber-reinforced composite material.

The fluororesin contains a tetrafluoroethylene unit and a vinylidene fluoride unit, the tetrafluoroethylene unit representing 55 to 95 mol % of all the monomer units constituting the fluororesin, the vinylidene fluoride unit representing 45 to 5 mol % of all the monomer units constituting the fluororesin.

The fluororesin preferably satisfies that the tetrafluoroethylene unit represents 55.0 to 90.0 mol % of all the monomer units constituting the fluororesin and the vinylidene fluoride unit represents 45.0 to 10.0 mol % of all the monomer units constituting the fluororesin.

The fluororesin more preferably satisfies that the tetrafluoroethylene unit represents 55.0 to 85.0 mol % of all the monomer units constituting the fluororesin and the vinylidene fluoride unit represents 45.0 to 15.0 mol % of all the monomer units constituting the fluororesin.

The fluororesin still more preferably satisfies that the tetrafluoroethylene unit represents 55.0 to 80.0 mol % of all the monomer units constituting the fluororesin and the vinylidene fluoride unit represents 45.0 to 20.0 mol % of all the monomer units constituting the fluororesin.

The fluororesin particularly preferably satisfies that the tetrafluoroethylene unit represents 55.0 to 70.0 mol % of all the monomer units constituting the fluororesin and the vinylidene fluoride unit represents 45.0 to 30.0 mol % of all the monomer units constituting the fluororesin.

The fluororesin preferably further contains at least one unit of an ethylenically unsaturated monomer selected from the group consisting of ethylenically unsaturated monomers represented by the formula (1) and ethylenically unsaturated monomers represented by the formula (2).

$$CX^{11}X^{12}=CX^{13}(CX^{14}X^{15})_{n11}X^{16} \quad \text{Formula (1):}$$

In the formula, $X^{11}$ to $X^{16}$ are the same as or different from each other, and are each H, F, or Cl; and $n^{11}$ is an integer of 0 to 8. The ethylenically unsaturated monomers represented by the formula (I) exclude tetrafluoroethylene and vinylidene fluoride.

$$CX^{21}X^{22}=CX^{23}-O(CX^{24}X^{25})_{n21}X^{26} \quad \text{Formula (2):}$$

In the formula, $X^{21}$ to $X^{26}$ are the same as or different from each other, and are each H, F, or Cl; and $n^{21}$ is an integer of 0 to 8.

Preferred among the ethylenically unsaturated monomers represented by the formula (1) is at least one selected from the group consisting of $CF_2=CFCl$, $CF_2=CFCF_3$, those represented by the formula (3):

$$CH_2=CF-(CaF_2)_{n11}X^{16} \quad (3)$$

(wherein $X^{16}$ and $n^{11}$ are defined as mentioned above), and those represented by the formula (4)

$$CH_2=CH-(CF_2)_{n11}X^{16} \quad (4)$$

(wherein $X^{16}$ and $n^{11}$ are defined as mentioned above); more preferred is at least one selected from the group consisting of $CF_2=CFCl$, $CH_2=CFCF_3$, $CH_2=CH-C_4F_9$, $CH_2=CH-C_6F_{13}$, $CH_2=CF-C_3F_6H$, and $CF_2=CFCF_3$; and still more preferred is at least one selected from the group consisting of $CH_2=CFCl$, $CH_2=CH-C_6F_{13}$, and $CH_2=CFCF_3$.

Preferred among the ethylenically unsaturated monomers represented by the formula (2) is at least one selected from the group consisting of $CF_2=CF-OCF_3$, $CF_2=CF-OCF_2CF_3$, and $CF_2=CF-OCF_2CF_2CF_3$.

In the fluororesin further containing the ethylenically unsaturated monomer, preferably, the tetrafluoroethylene unit represents 55.0 to 94.9 mol % of all the monomer units constituting the fluororesin, the vinylidene fluoride unit represents 5.0 to 44.9 mol % of all the monomer units constituting the fluororesin, and the ethylenically unsaturated monomer unit represents 0.1 to 5.0 mol % of all the monomer units constituting the fluororesin.

More preferably, the tetrafluoroethylene unit represents 55.0 to 90.0 mol % of all the monomer units constituting the fluororesin, the vinylidene fluoride unit represents 5.0 to 44.9 mol % of all the monomer units constituting the fluororesin, and the ethylenically unsaturated monomer unit represents 0.1 to 5.0 mol % of all the monomer units constituting the fluororesin.

Still more preferably, the tetrafluoroethylene unit represents 55.0 to 85.0 mol % of all the monomer units constituting the fluororesin, the vinylidene fluoride unit represents 10.0 to 44.9 mol % of all the monomer units constituting the fluororesin, and the ethylenically unsaturated monomer unit represents 0.1 to 5.0 mol % of all the monomer units constituting the fluororesin.

Particularly preferably, the tetrafluoroethylene unit represents 55.0 to 80.0 mol % of all the monomer units constituting the fluororesin, the vinylidene fluoride unit represents 15.0 to 44.9 mol % of all the monomer units constituting the fluororesin, and the ethylenically unsaturated monomer unit represents 0.1 to 5.0 mol % of all the monomer units constituting the fluororesin.

Most preferably, the tetrafluoroethylene unit represents 55.0 to 70.0 mol % of all the monomer units constituting the fluororesin, the vinylidene fluoride unit represents 25.0 to 44.9 mol % of all the monomer units constituting the fluororesin, and the ethylenically unsaturated monomer unit represents 0.1 to 5.0 mol % of all the monomer units constituting the fluororesin.

The fluororesin is preferably a copolymer containing:
55.0 to 90.0 mol % of a copolymerized unit of tetrafluoroethylene;
5.0 to 44.9 mol % of a copolymerized unit of vinylidene fluoride; and
0.1 to 10.0 mol % of a copolymerized unit of an ethylenically unsaturated monomer represented by the formula (1).

The fluororesin is more preferably a copolymer containing:
55.0 to 85.0 mol % of a copolymerized unit of tetrafluoroethylene;
10.0 to 44.9 mol % of a copolymerized unit of vinylidene fluoride; and
0.1 to 5.0 mol % of a copolymerized unit of an ethylenically unsaturated monomer represented by the formula (1).

The fluororesin is still more preferably a copolymer containing:
55.0 to 85.0 mol % of a copolymerized unit of tetrafluoroethylene;
13.0 to 44.9 mol % of a copolymerized unit of vinylidene fluoride; and
0.1 to 2.0 mol % of a copolymerized unit of an ethylenically unsaturated monomer represented by the formula (1).

In order not only to improve the mechanical strength of the fluororesin at high temperatures but also to enjoy particularly excellent low permeability of the fluororesin, the ethylenically unsaturated monomer represented by the formula (1) is preferably at least one monomer selected from the group consisting of $CH_2=CH-C_4F_9$, $CH_2=CH-C_6F_{13}$, and $CH_2=CF-C_3F_6H$. More preferably, the ethylenically unsaturated monomer represented by the formula (1) is at least one monomer selected from the group consisting of $CH_2=CH-C_4F_9$, $CH_2=CH-C_6F_{13}$, and $CH_2=CF-C_3F_6H$, and the fluororesin is a copolymer containing:
55.0 to 80.0 mol % of a copolymerized unit of tetrafluoroethylene;
19.5 to 44.9 mol % of a copolymerized unit of vinylidene fluoride; and
0.1 to 0.6 mol % of a copolymerized unit of an ethylenically unsaturated monomer represented by the formula (1).

The fluororesin may also be a copolymer containing: 58.0 to 85.0 mol % of a copolymerized unit of tetrafluoroethylene;
10.0 to 41.9 mol % of a copolymerized unit of vinylidene fluoride; and
0.1 to 5.0 mol % of a copolymerized unit of an ethylenically unsaturated monomer represented by the formula (1).

The fluororesin is also preferably a copolymer containing:
55.0 to 90.0 mol % of a copolymerized unit of tetrafluoroethylene;

9.2 to 44.2 mol % of a copolymerized unit of vinylidene fluoride; and 0.1 to 0.8 mol % of a copolymerized unit of an ethylenically unsaturated monomer represented by the formula (2).

The fluororesin is more preferably a copolymer containing:

58.0 to 85.0 mol % of a copolymerized unit of tetrafluoroethylene;

14.5 to 39.9 mol % of a copolymerized unit of vinylidene fluoride; and 0.1 to 0.5 mol % of a copolymerized unit of an ethylenically unsaturated monomer represented by the formula (2).

The fluororesin is also preferably a copolymer containing:

55.0 to 90.0 mol % of a copolymerized unit of tetrafluoroethylene;

5.0 to 44.8 mol % of a copolymerized unit of vinylidene fluoride;

0.1 to 10.0 mol of a copolymerized unit of an ethylenically unsaturated monomer represented by the formula (1); and 0.1 to 0.8 mol % of a copolymerized unit of an ethylenically unsaturated monomer represented by the formula (2).

The fluororesin is more preferably a copolymer containing:

55.0 to 85.0 mol % of a copolymerized unit of tetrafluoroethylene;

9.5 to 44.8 mol % of a copolymerized unit of vinylidene fluoride;

0.1 to 5.0 mol % of a copolymerized unit of an ethylenically unsaturated monomer represented by the formula (1); and 0.1 to 0.5 mol % of a copolymerized unit of an ethylenically unsaturated monomer represented by the formula (2).

The fluororesin is still more preferably a copolymer containing:

55.0 to 80.0 mol % a copolymerized unit of tebrafluoroethylene;

19.8 to 44.8 mol % of a copolymerized unit of vinylidene fluoride;

0.1 to 2.0 mol % of a copolymerized unit of an ethylenically unsaturated monomer represented by the formula (1); and 0.1 to 0.3 mol % of a copolymerized unit of an ethylenically unsaturated monomer represented by the formula (2). The fluororesin having this composition exhibits particularly excellent low permeability.

The fluororesin may also be a copolymer containing:

58.0 to 85.0 mol % of a copolymerized unit of tetrafluoroethylene;

9.5 to 39.8 mol % of a copolymerized unit of vinylidene fluoride;

0.1 to 5.0 mol % of a copolymerized unit of an ethylenically unsaturated monomer represented by the formula (1); and 0.1 to 0.5 mol % of a copolymerized unit of an ethylenically unsaturated monomer represented by the formula (2).

The fluororesin in which the amounts of the monomers fall within the above respective ranges has higher crystallinity and a higher storage elastic modulus at 170° C. than conventionally known copolymers containing tetrafluoroethylene, vinylidene fluoride, and a third component. Thus, this fluororesin has excellent mechanical strength, chemical resistance, and low permeability, at high temperatures. The low permeability at high temperatures herein means the low permeability against fluids such as methane, hydrogen sulfide, $CO_2$, methanol, and hydrochloric acid.

The amounts of the respective monomers of the copolymer can be calculated as the amounts of the monomer units by appropriate combination of NMR and elemental analysis in accordance with the types of the monomers.

The fluororesin preferably has a melt flow rate (MFR) of 0.1 to 500 g/10 min, more preferably has a melt flow rate (MFR) of 1 to 100 g/10 min.

The MFR refers to the mass (g/10 min) of a polymer flowing out of a nozzle (inner diameter: 2 mm, length: 8 mm) per 10 minutes at 297° C. and a 5-kg load using a melt indexer (Togo Seiki Seisaku-sho, Ltd.) in conformity with ASTM D3307-01.

The fluororesin preferably has a melting point of 180° C. or higher, and the upper limit thereof may be 290° C. The lower and upper limits thereof are more preferably 200° C. and 270° C., respectively.

The melting point refers to the temperature corresponding to the peak on an endothermic curve obtained by thermal analysis at a temperature-increasing rate of 10° C./min using a differential scanning calorimeter RDC220 (Seiko Instruments Inc.) in conformity with ASTM D-4591.

The fluororesin preferably has a pyrolysis starting temperature (1% mass reduction temperature) of 360° C. or higher. The lower limit thereof is more preferably 370° C. The upper limit of the pyrolysis starting temperature may be 450° C., for example, as long as it falls within the above range.

The pyrolysis starting temperature refers to the temperature at which 1 mass % of a fluororesin subjected to a heating test is decomposed, and is a value obtainable by measuring the temperature at which the mass of the fluororesin subjected to the heating test is reduced by 1 mass % using a thermogravimetric/differential thermal analyzer (TG-DTA).

The fluororesin preferably has a storage elastic modulus (E') of 60 to 400 MPa measured at 170° C. by dynamic viscoelasticity analysis.

The storage elastic modulus is a value determined at 170° C. by dynamic viscoelasticity analysis. Specifically, the storage elastic modulus is a value determined on a sample having a length of 30 mm, width of 5 mm, and thickness of 0.25 mm using a dynamic viscoelasticity analyzer DVA220 (IT Keisoku Seigyo Co., Ltd.) in a tensile mode at a clamp width of 20 mm, a measurement temperature of 25° C. to 250° C., a temperature-increasing rate of 2° C./min, and a frequency of 1 Hz. The storage elastic modulus (E') at 170° C. is more preferably 80 to 350 MPa, still more preferably 100 to 350 MPa.

The measurement sample may be prepared by setting the molding temperature to a temperature higher than the melting point of the fluororesin by 50° C. to 100° C., molding the material into a film having a thickness of 0.25 mm under a pressure of 3 MPa, and cutting the film into a size of 30 mm in length and 5 mm in width, for example.

The fluororesin may also be produced by a polymerization technique such as solution polymerization, bulk polymerization, emulsion polymerization, or suspension polymerization. In order to industrially easily produce the fluororesin, emulsion polymerization or suspension polymerization is preferred.

In the above polymerization, a polymerization initiator, a surfactant, a chain-transfer agent, and a solvent may be used, and each of these components may be conventionally known one.

The polymerization initiator may be an oil-soluble radical polymerization initiator or a water-soluble radical polymerization initiator.

The oil-soluble radical polymerization initiator may be a known oil-soluble peroxide. Typical examples thereof include dialkyl peroxycarbonates such as diisopropyl peroxydicarbonate, di-n-propyl peroxydicarbonate, and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di($\omega$-hydro-dodecafluoroheptanoyl)peroxide, di($\omega$-hydro-tetradecafluoroheptanoyl)peroxide, di($\omega$-hydro-hexadecafluorononanoyl) peroxide, di(perfluorobutyryl)peroxide, di(perfluorovaleryl) peroxide, di(perfluorchexanoyl)peroxide, di(perfluoroheptanoyl)peroxide, di(perfluorooctanoyl)peroxide, di(perfluorononanoyl)peroxide, di($\omega$-chloro-hexafluorobutyryl)peroxide, di($\omega$-chloro-decafluorohexanoyl)peroxide, di($\omega$-chloro-tetradecafluorooctanoyl) peroxide, $\omega$-hydro-dodecafluoroheptanoyl-$\omega$-hydro-hexadecafluorononanoyl-peroxide, $\omega$-chloro-hexafluorobutyryl-$\omega$-chloro-decafluorohexanoyl-peroxide, $\omega$-hydro-dodecafluoroheptanoyl-perfluorobutyryl-peroxide, di(dichloropentafluorobutanoyl)peroxide, di(trichlorooctafluorohexanoyl)peroxide, di(tetrachloroundecafluorootanoyl)peroxide, di(pentachlorotetradecafluorodecanoyl)peroxide, and di(undecachlorodotriacontafluorodocosanoyl) peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleate, and t-butyl hydroperoxide. A reducing agent such as a sulfite or a sulfurous acid salt may be used in combination with a peroxide, and the amount thereof may be 0.1 to 20 times the amount of the peroxide.

The surfactant may be a known surfactant, and examples thereof include nonionic surfactants, anionic surfactants, and cationic surfactants. Preferred are fluorine-containing anionic surfactants, and more preferred are C4-C20 linear or branched fluorine-containing anionic surfactants optionally containing an ether-bond oxygen (in other words, an oxygen atom may be present between carbon atoms). The amount thereof (relative to the water as a polymerization medium) is preferably 50 to 5000 ppm.

Examples of the chain-transfer agent include hydrocarbons such as ethane, isopentane, n-hexane, and cyclohexane; aromatic compounds such as toluene and xylene; ketones such as acetone; acetates such as ethyl acetate and butyl acetate; alcohols such as methanol and ethanol; mercaptans such as methyl mercaptan; and halogenated hydrocarbons such as carbon tetrachloride, chloroform, methylene chloride, and methyl chloride. The amount thereof may vary in accordance with the chain transfer constant of the compound used, and is usually 0.01 to 20 mass % relative to the polymerization solvent.

Examples of the solvent include water and solvent mixtures of water and an alcohol.

In the suspension polymerization, a fluorosolvent may be used in addition to water. Examples of the fluorosolvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$, and $CF_3CF_2CF_2CF_2CF_3$. Perfluoroalkanes are preferred. From the viewpoints of the suspension performance and economic efficiency, the amount of the fluorosolvent is preferably 10 to 100 mass % relative to the aqueous medium.

The polymerization temperature may be any temperature, and may be 0° C. to 100° C. The polymerization pressure is appropriately determined in accordance with other polymerization conditions such as the type, amount, and vapor pressure of a solvent used, and the polymerization temperature. It may usually be 0 to 9.8 MPaG.

The fiber-reinforced composite material may further contain any of different components other than the fluororesin and the reinforcing fiber. Examples of the different components include fillers, plasticizers, processing aids, release agents, pigments, flame retardants, lubricants, photostabilizers, weather-resistance stabilizers, conductive agents, antistatics, ultraviolet absorbers, antioxidants, blowing agents, flavors, oils, agents to impart flexibility, dehydrofluorinating agents, nucleating agents, softeners, surfactants, and impregnation aids.

Examples of the fillers include polytetrafluoroethylene, mica, silica, talc, Celite, clay, titanium oxide, and barium sulfate. An example of the conductive agents is carbon black. Examples of the plasticizers include dioctyl phthalate and pentaerythritol. Examples of the processing aids include carnauba wax, sulfone compounds, low molecular weight polyethylene, and fluorine aids. Examples of the dehydrofluorinating agents include organic onium compounds and amidines.

A resin other than the above fluororesin or rubber may be blended into the fiber-reinforced composite material. Preferred is a blend thereof with at least one selected from the group consisting of polyvinylidene fluoride (PVDF), polyether ether ketone (PEEK), and polytetrafluoroethylene (PTFE).

The fluororesin contained in the fiber-reinforced composite material may be cross-linked. This improves abrasion resistance against metal, rapid gas decompression resistance, and chemical resistance.

In order to further improve the abrasion resistance against metal, the cross-linking method is preferably radiation cross-linking.

In the radiation cross-linking, the fiber-reinforced composite material is irradiated with radiation. Examples of the radiation include electron beams, ultraviolet rays, gamma rays, X-rays, neutron beams, and high-energy ions. Preferred are electron beams because they have an excellent penetrating ability, a high dose rate, and are suitable for industrial production.

The irradiation may be performed by any method, such as a method with a conventionally known irradiation device.

The irradiation may be performed in any environment. The environment preferably has an oxygen concentration of 1000 ppm or less. It is more preferably in the absence of oxygen, still more preferably in vacuo or in an atmosphere of inert gas such as nitrogen, helium, or argon.

The irradiation temperature is preferably 0° C. to 300° C., more preferably 5° C. or higher, still more preferably 10° C. or higher, particularly preferably 20° C. or higher, while more preferably 100° C. or lower. The irradiation temperature is also preferably not higher than the glass transition temperature of the fluororesin, more preferably not higher than the melting point of the fluororesin. Too high an irradiation temperature may cause decomposition of the resin. Too low an irradiation temperature may cause insufficient cross-linking.

Preferably, the irradiation temperature falls within the above numerical range and is lower than the melting point of the fluororesin.

The irradiation temperature may be adjusted by any method, including known methods. Specific examples thereof include a method of holding the fluororesin in a heating furnace maintained at a predetermined temperature and a method of placing the fluororesin on an electric griddle and then heating the electric griddle by supplying an electric current to a built-in heater of the electric griddle or by means of an external heater.

The radiation exposure is preferably 10 to 500 kGy, more preferably 15 to 400 kGy, still more preferably 20 to 300 kGy, particularly preferably 30 to 250 kGy, most preferably 30 to 150 kGy. Too high or too low an exposure may cause insufficient cross-linking.

The cross-linked fiber-reinforced composite material preferably has a melt flow rate (MFR) of 0 to 1 g/10 min, more preferably 0 to 0.1 g/10 min.

The fiber-reinforced composite material is preferably a tape. The tape is preferably a band-like article having flexibility that allows the tape to be coiled (wrapped). The tape of the invention has a great maximum stress, a great maximum elongation, and a great tensile modulus.

The tape of the invention may have any substantially band-like shape, and examples thereof are as follows.
(1) Those Having a Rectangular Cross-Section The tape of Embodiment (1) has a simple shape and is easy to produce.

FIG. 1(a) shows an exemplary cross-section of the tape of Embodiment (1).
(2) Those Having Thin Portions at the Respective Widthwise Ends The tape of Embodiment (2) can be wrapped around an object without a gap by wrapping the tape such that the corresponding thin portions of adjacent wraps of the tape overlap each other. Thus, even if applied to a tape layer constituting a flexible pipe for a high-temperature fluid stream, the tape can easily inhibit permeation of the high-temperature fluid to the outside. Further, overlapping of the thin portions can easily provide a tape layer having a uniform thickness.

The thin portions at the respective widthwise ends are preferably disposed on the opposite ends in the thickness direction. In other words, preferably, one thin portion is disposed on the upper end side while the other is disposed on the lower end side in the thickness direction.

Figure 1B:
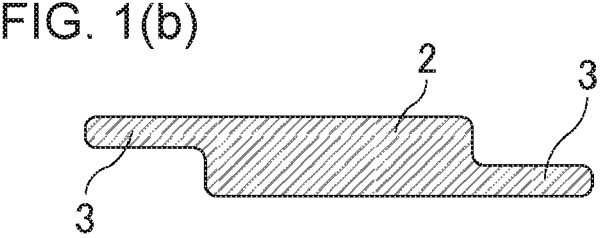

FIG. 1(b) shows an exemplary cross-section of the tape of Embodiment (2).

A tape 1b has thin portions 3 that are thinner than a central portion 2 at the respective widthwise ends. One thin portion 3 is disposed on the upper end side while the other thin portion 3 is disposed on the lower end side in the thickness direction of the tape 1b.

It should be noted that Embodiment (2) does not include Embodiment (3) described below.
(3) Those Having a Shape with a Widthwise End being Interlockable with the Corresponding Widthwise End of an Adjacent Wrap of the Tape in a Wrapped State Examples of the tape of Embodiment (3) include those having a cross-section such as, but not limited to, a substantially Z-like shape, a substantially U-like shape, a substantially S-like shape, a substantially T-like shape, or a substantially I-like shape.

The tape of Embodiment (3) can provide a tape layer in which the wraps of the tape are interlocked with each other by wrapping the tape such that a widthwise end of one wrap of the tape is engaged with the corresponding widthwise end of an adjacent wrap of the tape. Thus, when applied to a tape layer constituting a flexible pipe for a high-temperature fluid stream, the tape can be prevented from shifting during bending or twisting of the flexible pipe. This more securely enables prevention of outflow of the fluid passing through the flexible pipe.

The tape of Embodiment (3) particularly preferably has a substantially Z-like cross-section. Specifically, the tape preferably has thin portions at the respective widthwise ends and has protrusions extending from the respective thin portions at the widthwise ends in the opposite directions (counter directions) in the thickness direction.

Since this tape has key-like portions (key portions) at the respective widthwise ends, it can provide a tape layer in which the wraps of the tape are interlocked with each other by wrapping the tape such that key portions of adjacent wraps of the tape are engaged with each other, in other words, by wrapping the tape such that a recess defined by a protrusion and a thin portion of one wrap of the tape is fit into the corresponding protrusion of an adjacent wrap of the tape.

Figure 1C:
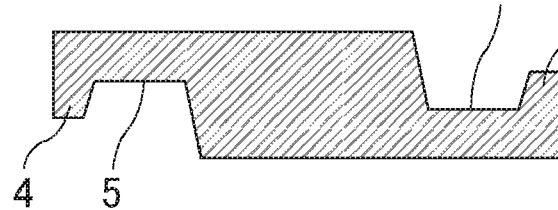

FIG. 1(c) shows an exemplary cross-section of the tape of Embodiment (3).

A tape is has a substantially Z-like cross-section. The tape 1c has thin portions 5 at the respective widthwise ends, and further has protrusions 4 extending from the two thin portions 5 in the opposite directions (counter directions) in the thickness direction.

The tape of the invention is particularly preferably the tape of Embodiment (3).

The tape of the invention can be produced by molding the fluororesin and the reinforcing fiber, if necessary together with any of the above different components, by a technique such as extrusion molding, pultrusion, press molding, melt infiltration, extrusion laminating, or dry powder coating. Any of these molding techniques may be combined. Alternatively, the fluororesin may be processed into filaments, if necessary together with any of the above different components, woven into a woven tape with a desired shape, and combined with the reinforcing fiber.

The pultrusion, the dry powder coating, and the extrusion laminating may be performed by the methods described in the following literature: Ben Goichi, "Molding and properties of continuous fiber FRTP (Renzokuseni FRTP no Seikeihou to Tokusei)", The Nikkan Kogyo Shimbun, Ltd., Mar. 30, 2015, pages 75, 85, and 143.

The tape of the invention is preferably prepared by combining a film or powder of the fluororesin and the reinforcing fiber, more preferably prepared by combining a film or powder of the fluororesin and the reinforcing fiber sheet, still more preferably prepared by combining a film or powder of the fluororesin and the reinforcing fiber woven fabric of the reinforcing fiber.

The combining may be performed, for example, by molding the fluororesin into a film and then heat-pressing the film and the reinforcing fiber. The reinforcing fiber is preferably in the form of a sheet, more preferably in the form of a reinforcing fiber woven fabric. When the reinforcing fiber sheet or the reinforcing fiber woven fabric is used, the fluororesin film may be disposed on each surface of the reinforcing fiber and the materials may combined by heat-pressing.

The film to be used in the combining may be obtained by molding the fluororesin by extrusion molding, press molding, or other method.

The tape of the invention may have an appropriately adjusted width, thickness, and length in accordance with the use thereof. In the case of applying the tape of the invention to flexible pipes for high-temperature fluid streams such as riser pipes, the width may be 1 mm to 10 m and the thickness may be 10 μm to 5 cm, for example. The length may be determined in accordance with factors such as the amount of the tape to be used. In the case of applying the tape to flexible pipes for high-temperature fluid streams, the length may be about 1 m to 1000 km.

The invention also relates to a laminate including a first layer and a second layer disposed on the first layer, the second layer including the fiber-reinforced composite material.

One or both of the surfaces of each layer of the laminate may be treated by a technique such as plasma discharge or corona discharge. Further, an adhesive may be applied thereto. The first layer and the second layer may or may not be bonded to each other.

The first layer preferably includes a polymer. Examples of the polymer include fluoropolymers, polyether ether ketone (PEEK), polyimide, polyether ketone, polyether ketone ketone, polyether ketone ether ketone ketone, polyamide, and mixtures thereof.

Examples of the fluoropolymers include the fluororesin and polyvinylidene fluoride (PVDF).

The laminate may further include a layer different from the first layer and the second layer. For example, in accordance with the use, an additional layer may be disposed on the surface of the first layer opposite to the second layer and/or on the surface of the second layer opposite to the first layer.

The laminate is preferably a pipe. When the laminate is a pipe, the fiber-reinforced composite material is preferably a tape. In addition, when the laminate is a pipe, the first layer may be a flexible tube as described below.

The invention also relates to a pipe including a first layer and a second layer formed from the tape disposed on the first layer, the first layer and the second layer being stacked in the given order from the inside of the pipe, and the second layer being formed from the tape wrapped around the outer surface of the first layer. The first layer and the second layer may or may not be bonded to each other.

Pipes used in offshore oil fields include risers (pipes for pumping up crude oil), umbilicals (integration of pipes for supplying chemicals for crude oil viscosity reduction for the purpose of controlling the pumping, power cables, and others), flowlines (pipes for transporting pumped crude oil which extend on the sea floor), and the like. They have various structures, and known pipes include metal-made pipes and metal/resin hybrid pipes. In order to achieve weight reduction, use of metal-made pipes tends to be reduced and metal/resin hybrid pipes are becoming the mainstream.

Conventional pipes used for offshore oil fields are provided with multiple metal layers so that they are resistant to inside and outside pressures. Such pipes can therefore be used for a high-pressure fluid stream or applied to deep-sea uses. However, fluids passing through the pipes often contain corrosive substances such as hydrogen sulfide, and the corrosive substances may permeate the resin layer and corrode the metal layer. Further, a high-pressure fluid passing through a pipe applies pressure to the resin layer, and the resin layer is bit into the metal layer which is harder than the resin layer, causing damage problems. Further, lighter-weight pipes are required.

The pipe of the invention including the second layer having a greater maximum stress, a greater maximum elongation, and a greater tensile modulus has excellent pressure resistance. Therefore, the number of metal layers can be reduced and the thickness of the metal layer can be reduced. Further, the pipe of the invention has better corrosion resistance and a lighter weight than conventional pipes. Further, a structure of layers causing biting of the resin layer is likely to be prevented.

The pipe, when applied to a flexible pipe for a high-temperature fluid stream such as a riser pipe, can inhibit permeation of the high-temperature fluid to the layer outside the second layer, and thus can prevent corrosion of the layer outside the second layer. This structure can also prevent a reduction in strength of the flexible pipe.

The first layer is preferably a flexible tube. The flexible tube may have either a monolayer structure or a multilayer structure. The multilayer structure may be formed by any method, preferably known sequential extrusion molding or co-extrusion molding.

The tube may be constituted by any material capable of imparting flexibility to the tube, and any of known materials used for various flexible pipes may be selected in accordance with the use. An example of the material is a polymer, and specific examples thereof include fluoropolymers, polyether ether ketone (PEEK), polyimide, polyether ketone, polyether ketone ketone, polyether ketone ether ketone ketone, polyamide, and mixtures thereof.

Examples of the fluoropolymers include the aforementioned fluororesin and polyvinylidene fluoride (PVDF).

In the second layer, the tope is preferably disposed such that the wraps of the tape are adjacent to each other in the width direction. Further, widthwise ends of adjacent wraps of the tape are preferably interlocked with each other. This embodiment can be achieved by the use of the tape of Embodiment (3), for example.

The second layer may include multiple layers of the tape.

Figure 2:
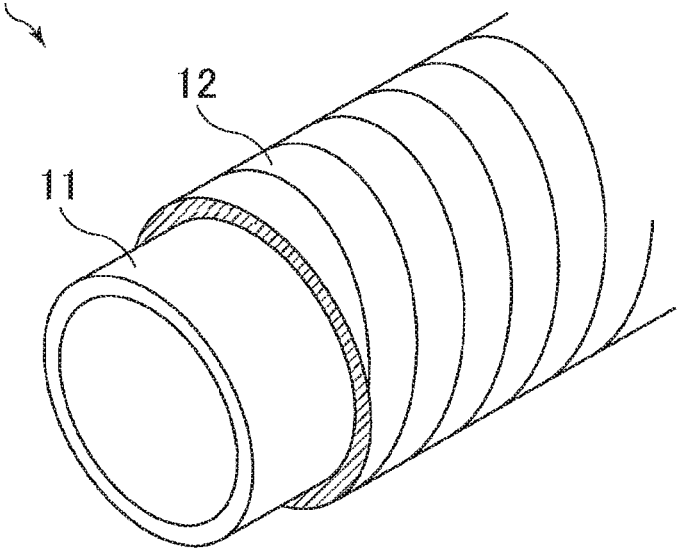
FIG. 2 is a schematic view of an example of the structure of the pipe.

In the pipe of the invention, the first layer and the second layer are each in the form of a tube, and the second layer is disposed on the first layer. FIG. 2 schematically shows an exemplary structure of the pipe of the invention.

Since the second layer in the pipe is formed from the tape of the invention, the mechanical strength of the pipe is less likely to decrease even when used in a high-temperature environment. The pipe, when applied to a flexible pipe for a high-temperature fluid stream such as a riser pipe, can inhibit permeation of the high-temperature fluid to the layer outside the second layer, and thus can prevent corrosion of the layer outside the second layer. This structure can also prevent a reduction in strength of the flexible pipe.

In the pipe of the invention, the tape layer (second layer) containing the resin has a better heat-insulating effect than the metal layers. Thus, the second layer can inhibit a temperature decrease inside the pipe (in a portion inside the second layer). This is especially effective in the case of transporting a material that suffers a rapid increase in viscosity and thereby becomes unable to flow inside the pipe when the temperature decreases. The heat-insulating effect can be further improved by foaming the tape to form cells therein, for example.

The second layer in the pipe of the invention is formed by wrapping the tape around the outer surface of the first layer. When the second layer is a tape-wrapping layer formed by wrapping the tape around the outer surface of the first layer, the wraps of the tape have play therebetween and the tape does not extend when the pipe is bent. Thus, this second layer can exert an effect of preventing reduction in physical properties or deformation of the tape layer after the pipe returns to the original state.

Figure 3:
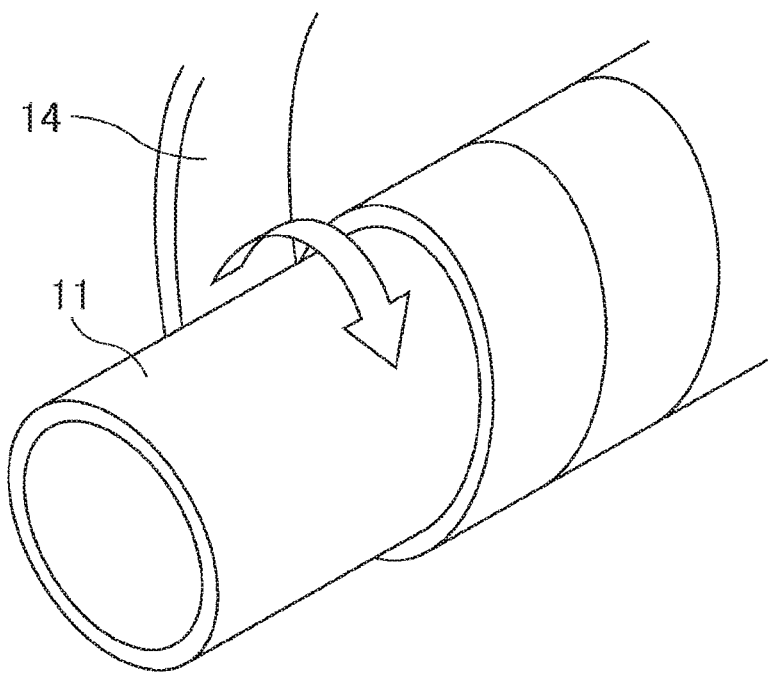
FIG. 3 is a schematic view of an example of a method for wrapping the tape.

The tape may be wrapped in any way, and is preferably wrapped spirally around the outer surface of the first layer, for example. FIG. 3 schematically shows an exemplary method of wrapping the tape. A tape 14 (the tape of the invention) is spirally wrapped around the outer surface of a tubular inner layer 11 (a first layer) in the direction indicated by the arrow in the figure.

Figure 4A:
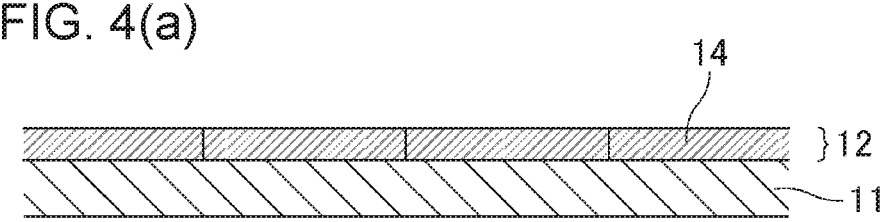
FIGS. 4(a) to 4(e) are schematic views of examples of the tape in a wrapped state.
Figure 4B:
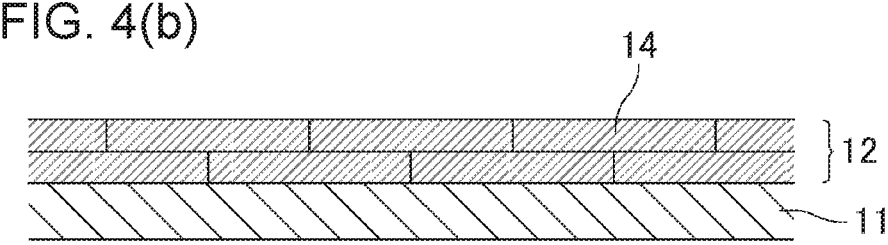

The tape may be wrapped around the outer surface of the first layer such that the corresponding widthwise ends of the adjacent wraps of the tape do not overlap each other (see, for example, FIG. 4(a)). Another piece of the tape may be further wrapped in the same manner around the outer surface of the resulting tape-wrapping layer with the wrapping position being shifted so as to cover the boundaries of the previous wrapping of the tape (see, for example, FIG. 4(b)). This more securely enables inhibition of permeation of a high-temperature fluid. In this case, the tape for the lower layer (inner layer) and the tape for the upper layer (outer layer) may be wrapped in the same direction. Still, the tapes are preferably wrapped in the opposite directions because the tensions applied to the pipe during wrapping are balanced and thus the tapes can be easily wrapped.

Figure 4C:
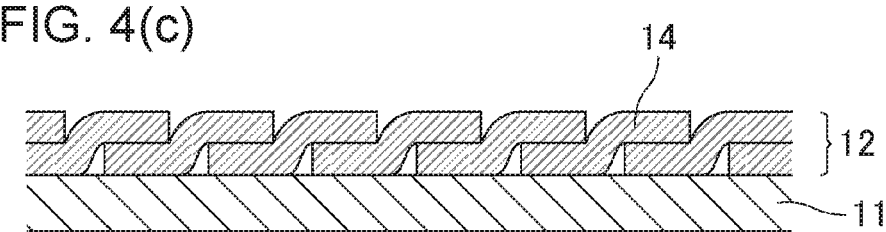

The tape may be wrapped such that the corresponding widthwise ends of the adjacent wraps of the tape overlap each other (see, for example, FIG. 4(c)). This more securely enables inhibition of permeation of a high-temperature fluid. In this embodiment, the tapes may also be wrapped in multiple layers in either the same direction or the opposite directions.

Figure 4D:
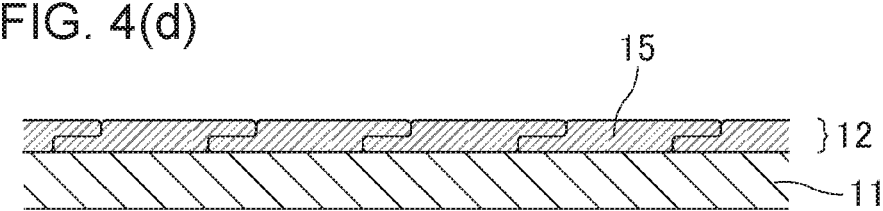

In the case of the tape having thin portions at the respective widthwise ends, the tape is preferably wrapped such that the corresponding thin portions of the adjacent wraps of the tape overlap each other (see, for example, FIG. 4(d)). This more securely enables inhibition of permeation of high-temperature fluid, and can also easily provide a tape-wrapping layer having a uniform thickness. In this embodiment, the tape may also be wrapped in multiple layers in either the same direction or the opposite directions.

Figure 4E:
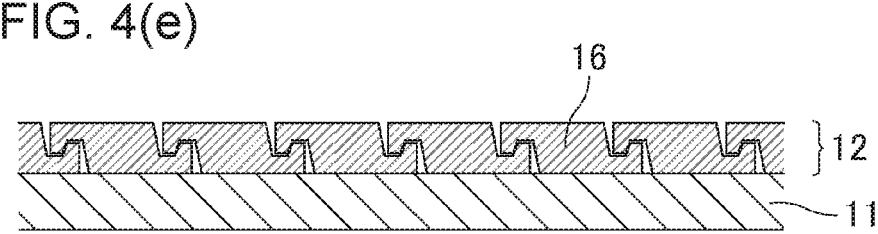

In the case of the tape having shapes that can be interlocked with each other, the tape is preferably wrapped such that the corresponding widthwise ends of the adjacent wraps of the tape are engaged with each other (see, for example, FIG. 4(e)). This can provide a tape-wrapping layer with the wraps of the tape interlocked with each other, and thus can prevent shifting of the tape when the pipe is bent or twisted. This consequently more securely enables inhibition of permeation of a high-temperature fluid, and can also easily provide a tape-wrapping layer having a uniform thickness. In this embodiment, the tape may also be wrapped in multiple layers in either the same direction or the opposite directions.

The tape may be wrapped using a known tape wrapper.

In the second layer, the corresponding widthwise ends of the adjacent wraps of the tape are preferably interlocked with each other. This embodiment may be achieved by wrapping the tape of Embodiment (3) around the outer surface of the first layer such that the corresponding widthwise ends of the adjacent wraps of the tape are engaged with each other, for example.

Figure 5:
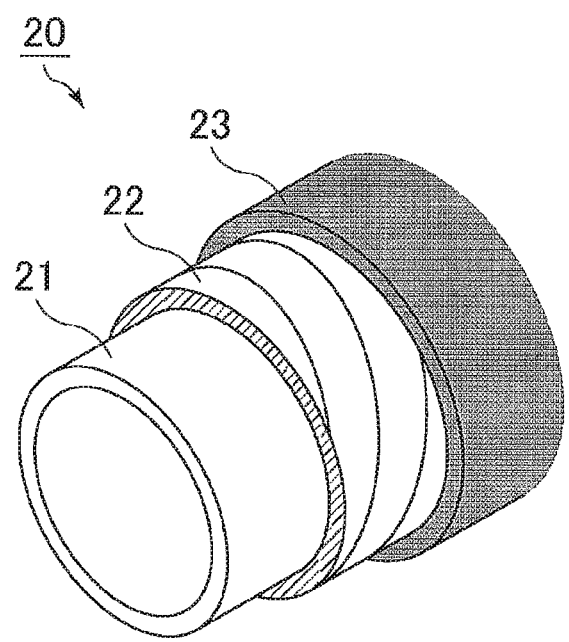
FIG. 5 is a schematic view of another example of the structure of the pipe.

The pipe of the invention preferably further includes a third layer disposed on the second layer. Examples of the material to be used for the third layer include metal, resin, and rubber. Preferred among these is metal. The third layer can be formed by covering the outer surface of the second layer with a required material by a known method, for example. FIG. 5 schematically shows an exemplary structure of the pipe of this embodiment. A pipe 20 includes a first layer 21, a second layer 22, and a third layer 23 (reinforcing layer) stacked in the given order from the inside.

In this embodiment, a bilayer laminate of the second layer and the third layer is disposed on the outer layer of the first layer, and this laminate can reinforce the first layer. In particular, when the third layer is a layer formed of metal, it can more sufficiently reinforce the first layer. Even when a high-temperature fluid is passed through the first layer, the second layer can inhibit permeation of the high-temperature fluid from the second layer to the third layer, and thus can prevent corrosion of the third layer. Further, this can prevent a reduction in the effect of reinforcing the first layer even under high-temperature conditions.

The pipe of the invention may optionally include an additional layer disposed on the outer surface of the third layer and/or an additional layer disposed on the inner surface of the first layer, as needed.

Since the pipe of the invention has the aforementioned excellent characteristics, it can suitably be used as a flexible metal tube disclosed in JP H07-276523 A, a high-temperature-fluid transport pipe disclosed in JP S61-6485 A, and a multilayer flexible pipe disclosed in US 2008/0314471 A, for example.

A riser pipe and a flowline each including the aforementioned pipe of the invention are also encompassed by the invention. The riser pipe and the flowline can suitably be used as a riser pipe and a flowline for transporting a material from the sea floor to the surface of the sea in an offshore oil field or a gas field. Examples of the material include fluids such as crude oil, petroleum gas, and natural gas.

Figure 6:
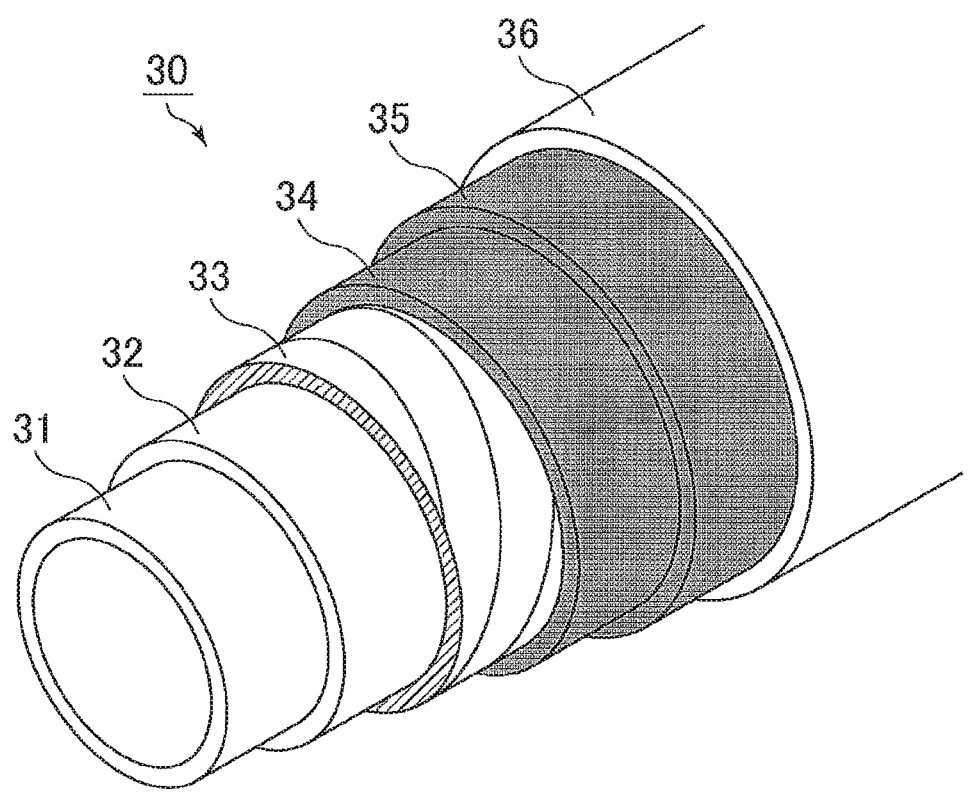
FIG. 6 is a schematic view of an example of the structure of a riser pipe (or a flowline).

FIG. 6 shows an exemplary embodiment of the riser pipe (or the flowline) of the invention. It should be noted that the riser pipe and the flowline of the invention are not limited thereto.

A riser pipe (or flowline) 30 includes a body (carcass) 31 serving as an innermost layer which can provide high-pressure resistance and maintain the pipe shape even when the riser pipe (or flowline) 30 is used in the deep sea. The outer surface of the body 31 is covered with a first layer 32 serving as a fluid barrier layer. The first layer 32 prevents a material passing through the riser pipe (or flowline) from leaking to the outside.

The outer surface of the first layer 32 is covered with a second layer 33, a first reinforcing layer 34, and a second reinforcing layer 35 as reinforcing layers. These layers exhibit an effect of preventing burst of the riser pipe (or flowline) due to the pressure of a material passing through the tube. The first reinforcing layer 34 and the second reinforcing layer 35 may be made of metal, and can be formed of metal strips wrapped in the opposite directions such that the riser pipe can be resistant to stresses applied in different directions. A friction-resistant layer may be disposed between the first reinforcing layer 34 and the second reinforcing layer 35. The second layer 33 is a layer formed by wrapping the tape of the invention around the outer surface of the first layer 32, and reinforces the first layer. In a conventional riser pipe, a layer corresponding to this layer is made of metal. Owing to such a feature, the riser pipe 30 can include only two metal layers although a conventional riser pipe includes three metal layers. In order to reduce the number of the reinforcing metal layers, the first reinforcing layer 34 or the second reinforcing layer 35 may be formed from the tape of the invention wrapped or two or more reinforcing layers may be formed from the tape of the invention wrapped.

In order to prevent damage to the first layer 32 which may be caused by a contact with a metallic reinforcing layer, a thermoplastic resin layer may be disposed between the first layer 32 and the body 31. An outer layer resin 36 is disposed on the outer surface of the first reinforcing layer 34 and the second reinforcing layer 35, and plays a role of partitioning the inside and outside of the riser pipe (or flowline). The outer layer resin 36 may be formed from polyethylene or polyamide.

To addition to the riser pipe and the flowline, the fiber-reinforced composite material or tape of the invention can be applied to other uses, and can suitably be used as a tape for forming friction-resistant layers of metal pipe for transporting fluids such as crude oil and natural gas whether in the ground, on the ground, or on the sea floor, for example. Crude oil and natural gas contain carbon dioxide and hydrogen sulfide which cause corrosion of metal pipes. The fiber-reinforced composite material or tape of the invention can block them to inhibit corrosion of metal pipes or to reduce the fluid friction due to highly viscous crude oil. In order to bond the fiber-reinforced composite material or tape to metal, adhesive may be used or the metal surface may be roughened. The tape of the invention exhibits characteristics suitable as seals, bellows, diaphragms, hoses, tubes, and electric wires, such as gaskets and non-contact or contact packings (self-seal packings, piston rings, split ring packings, mechanical seals, and oil seals) requiring heat resistance, oil resistance, fuel oil resistance, LLC resistance, and steam resistance for high-temperature parts around automobile engines or portions requiring chemical resistance, such as engine bodies, main drive systems, valve train systems, lubrication and cooling systems, fuel systems, and intake and exhaust systems of automobile engines; transmission systems of driveline systems; steering systems of chassis; braking systems; and electrical parts (e.g., basic electrical parts, electrical parts of control systems, and electrical accessories). In addition to the automobile-related uses, the tape of the invention is suitable for uses such as oil-, chemical-, heat-, steam-, or weather-resistant packings, O-rings, hoses, other sealants, diaphragms, and valves in transports such as shipping and aircraft; similar packings, O-rings, sealants, diaphragms, valves, hoses, rolls, tubes, chemical-resistant coatings, and linings used in chemical plants; similar packings, O-rings, hoses, sealants, belts, diaphragms, valves, rolls, and tubes used in food plant equipment and food machinery (including household items); similar packings, O-rings, hoses, sealants, diaphragms, valves, and tubes used in equipment for nuclear power plants; and similar packings, O-rings, hoses, sealants, diaphragms, valves, rolls, tubes, linings, mandrels, electric wires, flexible joints, belts, rubber plates, weather strips, and roll blades for plain paper copiers used in general industrial parts. Since the tape of the invention exhibits chemical resistance, low elution, and less flavor permeation, it can be applied to uses such as oil-, chemical-, heat-, steam-, or weather-resistant sealants, cap materials, belts, rolls, hoses, tubes, films, coatings, linings, joints, and containers in the medical and chemical fields.

The laminate of the invention can also be applied to pipes. In this case, pipes formed from the laminate can be produced by a typical method without any limitation. The pipes include corrugated tubes.

The fiber-reinforced composite material or tape of the invention has excellent properties such as mechanical properties, heat resistance, oil resistance, amine resistance, and chemical resistance, and can be used as various parts in various fields such as the automobile industry, the aircraft industry, and the semiconductor industry.

Examples of the fields where the fiber-reinforced composite material or tape is used include the field relating to semiconductors, the field of automobiles, the field of aircraft, the field of space and rockets, the field of shipping, the field of chemistry (e.g., chemical plants), the field of chemicals (e.g., pharmaceuticals), the field of photography (e.g., film processors), the field of printing (e.g., printers), the field of coating (e.g., coating equipment), the field of analysis and physical and chemical instruments (e.g., analyzers and measuring devices), the field of food machinery (e.g., food plant equipment and household items), the field of beverage and food production equipment, the field of drug production equipment, the field of medical parts, the field of equipment for transporting chemicals, the field of equipment for nuclear power plants, the field of steel (e.g., sheet steel processing equipment), the field of general industry, the field of electrics, the field of fuel cells, the field of electronic parts, the field of parts of optical devices, the field of parts of space devices, the field of equipment for petrochemical plants, the field of parts of equipment for prospecting and mining energy sources such as petroleum and gas, the field of oil refining, and the field of parts of equipment for transporting petroleum.

The fiber-reinforced composite material or tape of the invention may be used in any of various forms such as seal materials and packings, including rings, packings, gaskets, diaphragms, oil seals, bearing seals, lip seals, plunger seals, door seals, lip and face seals, gas delivery plate seals, wafer support seals, and barrel seals. The seal materials may be used in applications requiring heat resistance, solvent resistance, chemical resistance, and non-stickiness.

The fiber-reinforced composite material or tape of the invention may also be used as any of tubes, hoses, rolls, rubber rolls, flexible joints, rubber plates, coatings, belts, dampers, valves, valve sheets, valve bodies, chemical-resistant coating materials, laminating materials, and lining materials.

The cross-sectional shapes of the above rings, packings, and seals may be any various shapes, such as a rectangular shape, an O-like shape, and a ferrule shape, and any deformed shapes such as D-like, L-like, T-like, V-like, X-like, and Y-like shapes.

In the field relating to semiconductors, the fiber-reinforced composite material or tape of the invention may be used for semiconductor manufacturing devices, liquid crystal panel manufacturing devices, plasma panel manufacturing devices, plasma display panel manufacturing devices, plasma addressed liquid crystal panel manufacturing devices, organic EL panel manufacturing devices, field emission display panel manufacturing devices, solar cell substrate manufacturing devices, and semiconductor transporting devices. Examples of such devices include CVD devices, gas control devices (e.g., gas control devices for semiconductors), dry etching devices, wet etching devices, plasma etching devices, reactive ion etching devices, reactive ion beam etching devices, sputter etching devices, ion beam etching devices, diffusion and oxidation devices, spattering devices, ashing devices, plasma ashing devices, washing devices, ion implantation devices, plasma CVD devices, exhaust devices, exposure devices, grinding devices, film-forming devices, dry-etching washing devices, UV/$O_3$ washing devices, ion beam washing devices, laser beam washing devices, plasma washing devices, gas etching washing devices, extraction washing devices, Soxhlet extraction washing devices, high-temperature high-pressure extraction washing devices, microwave extraction washing devices, supercritical extraction washing devices, washing devices using hydrofluoric acid, hydrochloric acid, sulfuric acid, or ozonated water, steppers, coaters and developers, CMP devices, excimer laser exposure devices, chemical liquid pipes, gas pipes, devices involving plasma treatment (e.g., $NF_3$ plasma treatment, $O_2$ plasma treatment, fluorine plasma treatment), heating film-forming devices, wafer transporting devices, wafer washing devices, silicon wafer washing devices, silicon wafer processing devices, devices used in LP-CVD, devices used in lamp annealing, and devices used in reflow.

Specific examples of applications in the field relating to semiconductors include seal materials such as O-rings and gaskets for gate valves, quartz windows, chambers, chamber lids, gates, bell jars, couplings, and pumps; seal materials (e.g., O-rings), hoses, and tubes for resist developers and strippers; lining and coating of resist developer tanks, stripper tanks, wafer cleaning liquid tanks, and wet etching tanks; diaphragms of pumps; rolls for transporting wafers; hoses and tubes for wafer cleaning liquids; seal materials for clean equipment, such as sealants for clean equipment (e.g., cleanrooms); sealing materials for storage cabinets for devices such as semiconductor manufacturing devices and wafers; and diaphragms for transporting chemical liquids used in production of semiconductors.

In the field of automobiles, the fiber-reinforced composite material or tape of the invention may be used for engine bodies, main drive systems, valve train systems, lubrication and cooling systems, fuel systems, intake and exhaust systems, transmission systems of driveline systems, steering systems and braking systems of chassis, and electrical parts (e.g., basic electrical parts, electrical parts of control systems, electrical accessories). The field of automobiles also relates to motorcycles.

In relation to the aforementioned engine bodies and peripherals thereof, the fiber-reinforced composite material or tape of the invention may be used for seal materials requiring heat resistance, oil resistance, fuel oil resistance, resistance to antifreeze for engine cooling, and steam resistance. Examples of such seal materials include seals (e.g., gaskets, shaft seals, valve stem seals), non-contact or contact packings (e.g., self-seal packings, piston rings, split ring packings, mechanical seals, oil seals), bellows, diaphragms, hoses, tubes, and seal materials used for electric wires, cushioning materials, damping materials, and belt AT devices.

Specific examples of applications in the fuel systems include O-rings used for fuel injectors, cold start injectors, quick connectors of fuel lines, sender flange quick connectors, fuel pumps, fuel tank quick connectors, gasoline mixing pumps, gasoline pumps, tube bodies of fuel tubes, connectors of fuel tubes, and injectors; seals used for exhaust manifolds, fuel filters, pressure control valves, canisters, caps of fuel tanks, fuel pumps, fuel tanks, sender units of fuel tanks, fuel injection systems, high pressure fuel pumps, fuel line connector systems, pump timing control valves, suction control valves, solenoid sub-assemblies, and fuel cut valves; canister purge solenoid valve seals, onboard refueling vapor recovery (ORVR) valve seals, oil seals for fuel pumps, fuel sender seals, fuel tank roll over valve seals, filler seals, injector seals, filler cap seals, and seals of filler cap valves; hoses such as fuel hoses, fuel supply hoses, fuel return hoses, vapor (evaporator) hoses, vent (breather) hoses, filler hoses, filler neck hoses, hoses inside fuel tanks (in-tank hoses), control hoses of carburetors, fuel inlet hoses, and fuel breather hoses; gaskets used for fuel filters and fuel line connector systems, and flange gaskets used for carburetors; lining materials for vapor recovering lines, fuel feed lines, and vapor ORVR lines; diaphragms used for canisters, ORVR, fuel pumps, fuel tank pressure sensors, gasoline pumps, sensors of carburetors, combined air controlling (CAC) systems, pulsation dampers, canisters, and auto-valves, and pressure regulator diaphragms of fuel injection systems; valves for fuel pumps, carburetor needle valves, roll over check valves, and check valves; tubes used in vents (breathers) and fuel tanks; tank packings of, for example, fuel tanks, and packings of acceleration pump pistons of carburetors; fuel sender damping parts for fuel tanks; O-rings and diaphragms for regulating fuel pressure; accelerator pump cups; in-tank fuel pump mounts; injector cushion rings of fuel injection systems; injector seal rings; needle valve cores of carburetors; acceleration pump pistons of carburetors; valve sheets of combined air controlling (CAC) systems; fuel tank bodies; and sealing arts for solenoid valves.

Specific examples of applications in the brake systems include diaphragms used for mastervacs, hydraulic brake hose, air brakes, and brake chambers of air brakes; hoses used as brake hoses, brake oil hoses, and vacuum brake hoses; seal materials such as oil seals, O-rings, packings, and brake piston seals; air valves and vacuum valves for mastervacs, and check valves for brake valves; piston cups (rubber cups) for master cylinders and brake cups; and O-rings and grommets for master cylinders and vacuum boosters of hydraulic brakes, boots for wheel cylinders of hydraulic brakes, and anti-lock brake systems (ABS).

Specific examples of applications in the basic electrical parts include insulators and sheaths of electric wires (harnesses), tubes of harness exterior parts, and grommets for connectors.

Specific examples of applications in the electrical parts of control systems include coating materials of various sensor lines.

Specific examples of applications in the electrical accessories include O-rings and packings of automobile air conditioners, cooler hoses, high-pressure air conditioner hoses, air conditioner hoses, gaskets for electronic throttle units, plug boots for direct ignition, and diaphragms for distributors. Further, the fiber-reinforced composite material or tape may be used for bonding of electric parts.

Specific examples of applications in the intake and exhaust systems include packings used for intake manifolds and exhaust manifolds and throttle body packings of throttles; diaphragms used for exhaust gas recirculation (EGR) systems, pressure control (BPT) systems, wastegates, turbocharger wastegates, actuators, actuators of variable turbine geometry (VTG) turbochargers, and exhaust purifying valves; hoses such as control hoses of exhaust gas recirculation (EGR) systems, emission control hoses, turbo oil hoses (feed side), turbo oil hoses (return side), turbo air hoses, and intercooler hoses of turbochargers, turbocharger hoses, hoses connected with compressors of turbo engines equipped with intercoolers, exhaust gas hoses, air intake hoses, turbo hoses, and diesel particulate filter (DPF) sensor hoses; air ducts and turbo air ducts; intake manifold gaskets; and seal materials of EGR systems, valve sheets for preventing after burn of AS valves, turbine shaft seals (of turbochargers, for example), and seal parts used for groove parts of rocker covers and air intake manifolds used in engines of automobiles.

In addition, with respect to the exhaust gas control parts, the fiber-reinforced composite material or tape may be used as any of seals used for vapor recovery canisters, catalytic converters, exhaust gas sensors, and oxygen sensors and seals for solenoid armatures of vapor recovery and vapor canisters; and intake manifold gaskets.

With respect to the diesel engine-related parts, the fiber-reinforced composite material or tape may be used as any of O-ring seals for direct injectors, rotary pump seals, control diaphragms, fuel hoses, EGR systems, priming pumps, and diaphragms of boost compensators. The fiber-reinforced composite material or tape may also be used for O-rings, seal materials, hoses, tubes, and diaphragms used in urea SCR systems, urea solution tank bodies of urea SCR systems, and seal materials of urea solution tanks.

Specific examples of applications in the transmission systems include transmission-related bearing seals, oil seals, O-rings, packings, and torque converter hoses.

Examples of applications also include mission oil seals, mission oil hoses, ATF hoses, O-rings, and packings of AT.

Examples of the transmission include automatic transmission (AT), manual transmission (MT), continuously variable transmission (CVT), and dual clutch transmission (DCT).

Examples of applications also include oil seals, gaskets, O-rings, and packings for manual or automatic transmissions, oil seals, gaskets, O-rings, and packings for (belt-type or toroidal-type) continuously variable transmissions, packings for ATF linear solenoids, oil hoses for manual transmissions, ATF hoses for automatic transmissions, and CVTF hoses for (belt-type or toroidal-type) continuously variable transmissions.

Specific examples of applications in the steering systems include power steering oil hoses and high-pressure power steering hoses.

Examples of applications used in engine bodies of automobile engines include gaskets such as cylinder head gaskets, cylinder head cover gaskets, oil pan packings, and general gaskets, seals such as O-rings, packings, and timing belt cover gaskets, hoses such as control hoses, damper rubbers of engine mounts, control valve diaphragms, and camshaft oil seals.

Examples of applications in the main drive systems of automobile engines include shaft seals such as crankshaft seals and camshaft seals.

Examples of applications in the valve train systems of automobile engines include valve stem oil seals of engine valves and valve sheets of butterfly valves.

Examples of applications in the lubrication and cooling systems of automobile engines include engine oil cooler hoses of engine oil coolers, oil return hoses, seal gaskets, water hoses used around radiators, seals of radiators, gaskets of radiators, O-rings of radiators, vacuum pump oil hoses of vacuum pumps, radiator hoses, radiator tanks, diaphragms for oil pressure, and fan coupling seals.

As mentioned above, specific examples of applications in the field of automobiles include engine head gaskets, oil pan gaskets, manifold packings, seals for oxygen sensors, oxygen sensor bushes, seals for nitrogen oxide (NOx) sensors, nitrogen oxide (NOx) sensor bushes, seals for sulfur oxide sensors, seals for temperature sensors, temperature sensor bushes, seals for diesel particulate filter sensors, diesel particulate filter sensor bushes, injector O-rings, injector packings, O-rings and diaphragms of fuel pumps, gearbox seals, power piston packings, seals of cylinder liners, seals of valve stems, static valve stem seals, dynamic valve stem seals, front pump seals of automatic transmissions, rear axle pinion seals, gaskets of universal joints, pinion seals of speedometers, piston cups of foot brakes, O-rings and oil seals of torque transmission systems, seals and bearing seals of exhaust gas re-combustion systems, hoses for re-combustion systems, diaphragms for sensors of carburetors, damper rubbers (e.g., engine mounts, exhaust parts, muffler hangers, suspension bushes, center bearings, strut bumper rubbers), damper rubbers (e.g., strut mounts, bushes) for suspensions, drive system damper rubbers (e.g., dampers), fuel hoses, tubes and hoses of EGR systems, twin carburetor tubes, cores of needle valves of carburetors, flange gaskets of carburetors, oil hoses, oil cooler hoses, ATF hoses, cylinder head gaskets, water pump seals, gearbox seals, needle valve tips, reeds of reed valves for motorcycles, oil seals of automobile engines, seals of gasoline hose guns, seals for automobile air conditioners, rubber hoses for intercoolers of engines, seals of fuel line connector systems, CAC valves, needle tips, electric wires around engines, filler hoses, automobile air conditioner O-rings, intake gaskets, fuel tank materials, diaphragms for distributors, water hoses, clutch hoses, PS hoses, AT hoses, mastervac hoses, heater hoses, air conditioner hoses, ventilation hoses, oil filler caps, PS rack seals, rack and pinion boots, CVJ boots, ball joint dust covers, strut dust covers, weather strips, glass run channels, center unit packings, body side welts, bumper rubbers, door latches, dash insulators, high tension cords, flat belts, poly V-belts, timing belts, toothed belts, V-ribbed belts, tires, wiper blades, diaphragms and plungers for regulators of LPG vehicles, diaphragms and valves for regulators of CNG vehicles, DME-resistant rubber parts, diaphragms and boots of automatic belt tensioners, diaphragms and valves for idle speed control, actuators for cruise control, diaphragms, check valves, and plungers of negative-pressure pumps, diaphragms and O-rings of O.P.S., gasoline pressure relief valves, O-rings and gaskets of engine cylinder sleeves, O-rings and caskets of wet cylinder sleeves, seals and gaskets of differential gears (seals and gaskets for gear oils), seals and gaskets of power steering systems (seals and gaskets of PSF), seals and gaskets of shock absorbers (seals and gaskets of SAF), seals and gaskets of constant-velocity joints, seals and gaskets of wheel bearings, coatings for metal gaskets, caliper seals, boots, wheel bearing seals, and bladders used in vulcanization molding of tires.

In the fields of aircraft, space and rockets, and shipping, the fiber-reinforced composite material or tape may especially be used in the fuel systems and the lubrication systems.

In the field of aircraft, the fiber-reinforced composite material or tape may be used as, for example, any of seal parts for aircraft, parts for aircraft used in relation to engine oils for aircraft, jet engine valve stem seals, gaskets, O-rings, rotary shaft seals, gaskets of hydraulic equipment, fire wall seals, hoses, gaskets, and O-rings for fuel feed, and cables, oil seals, and shaft seals for aircraft.

In the field of space and rockets, the fiber-reinforced composite material or tape may be used as, for example, any of lip seals, diaphragms, and O-rings of spacecraft, jet engines, and missiles, O-rings resistant to oils for gas turbine engines, and damper stage pads for ground level control of missiles.

In the field of shipping, the fiber-reinforced composite material or tape may be used as, for example, any of propeller shaft stern seals of screws, valve stem seals for intake and exhaustion of diesel engines, valve seals of butterfly valves, valve sheets and shaft seals of butterfly valves, shaft seals of butterfly valves, stern tube seals, fuel hoses and gaskets, O-rings for engines, cables for shipping, oil seals for shipping, and shaft seals for shipping.

In the field of chemistry (e.g., chemical plants) and the field of chemicals (e.g., pharmaceuticals), the fiber-reinforced composite material or tape may be used in steps requiring high-level chemical resistance, such as steps of manufacturing chemicals, including pharmaceuticals, agrochemicals, coatings, and resins.

Specific examples of applications in the fields of chemistry and chemicals include: seals used for chemical devices, pumps for chemicals, flow meters, pipes for chemicals, heat exchangers, agrochemical sprayers, agrochemical transporting pumps, gas pipes, fuel cells, analyzers and physical and chemical instruments (e.g., column fittings of analyzers and measuring instruments), expansion joints of flue-gas desulfurization devices, nitric acid plants, and turbines of power plants, seals used in medical sterilization processes, seals for plating solutions, runner seals of belts for papermaking, and joint seals of wind tunnels; O-rings used in chemical devices (e.g., rectors, stirrers), analyzers and measuring instruments, chemical pumps, pump housings, valves, and tachometers, O-rings for mechanical seals, and O-rings for compressor sealing; packings used in high-temperature vacuum dryers and tube joints of gas chromatographs and meters, and glass cooler packings of sulfuric acid manufacturing devices; diaphragms used in diaphragm pumps, analyzers, and physical and chemical instruments; gaskets used in analyzers and measuring instruments; ferrules used in analyzers and measuring instruments; valve sheets; U-cups; linings used in chemical devices, gasoline tanks, and wind tunnels, and corrosion-resistant linings of tanks for anodizing on aluminum; coatings of masking jigs for plating; valve parts of analyzers and physical and chemical instruments; expansion joints of flue-gas desulfurization plants; hoses resistant to acids such as concentrated sulfuric acid, chlorine gas transporting hoses, oil-resistant hoses, and rainwater drainage hoses of benzene or toluene storage tanks; chemical-resistant tubes used in analyzers and physical and chemical instruments and medical tubes; trichloroethylene-resistant rolls for fiber dyeing and rolls for dyeing; stoppers for pharmaceuticals; medical rubber stoppers; chemical bottles, chemical tanks, bags, and chemical containers; strong acid-resistant and solvent-resistant protective items such as gloves and boots.

In the field of photography (e.g., film processors), the field of printing (e.g., printers), and the field of coatings (e.g., coating equipment), the fiber-reinforced composite material or tape may be used as any of rolls, belts, seals, and valve parts of dry copiers.

Specific examples of applications in the field of photography, the field of printing, and the field of coatings include surface layers of transfer rollers of copiers, cleaning blades of copiers, and belts of copiers; rolls (e.g., fixing rolls, adhesion rolls, and pressure rolls) and belts for OA equipment (e.g., copiers, printers, faxes); rolls, roll blades, and belts of PPOs; rolls of film processors and X-ray film processors; printing rolls, scrapers, tubes, valve parts, and belts of printing equipment; ink tubes, rolls, and belts of printers; application rolls, scrapers, tubes, and valve parts of application or coating equipment; processing rolls, gravure rolls, guide rolls, guide rolls of coating lines for manufacturing of magnetic tapes, gravure rolls of coating lines for manufacturing of magnetic tapes, and coating rolls.

In the field of food machinery (e.g., food plant equipment and household items), the fiber-reinforced composite material or tape may be used in steps of food production, food transportation, and food storage.

Specific examples of applications in the field of food machinery include seals of plate-type heat exchangers, solenoid valve seals of vending machines, packings of thermo pots, sanitary pipe packings, packings of pressure cookers, seals of boilers, gaskets for heat exchangers, diaphragms and packings for food processing equipment, rubber materials (e.g., seals such as heat exchanger gaskets, diaphragms, and O-rings, pipes, hoses, sanitary packings, valve packings, packings for filling used as joints between the mouth of a container (e.g., a bottle) and a filler) for food processing equipment. The fiber-reinforced composite material or tape may also be used as packings, gaskets, tubes, diaphragms, hoses, and joint sleeves used for products such as alcohols and soft drinks, filling devices, food sterilizers, brewing devices, boilers, and food vending machines.

In the field of equipment for nuclear power plants, the fiber-reinforced composite material or tape may be used as, for example, any of check valves and reducing valves around reactors and seals of devices for concentration of uranium hexafluoride.

Specific examples of applications in the field of general industry include seal materials for hydraulic devices such as machine tools, construction machinery, and hydraulic machines; seals and bearing seals of hydraulic, lubricating machinery; seal materials used in mandrels; seals used for windows of dry cleaning devices; seals and (vacuum) valve seals of cyclotrons, seals of proton accelerators, seals of automatic wrapping machines, diaphragms of pumps for analyzers (air pollution monitoring devices) for sulfurous acid gas or chlorine gas in the air, snake pump lining, rolls and belts of printers, belts (conveyor belts) for transportation, squeeze rolls for pickling of sheet steel, cables of robots, solvent squeezing rolls in aluminum rolling lines, O-rings of couplers, acid-resistant cushioning material, dust seals and lip rubbers of sliding portions of cutting machinery, gaskets of garbage incinerators, friction materials, metal or rubber surface modifiers, and covering materials. The fiber-reinforced composite material or tape may also be used as gaskets and seal materials of devices used in papermaking processes, sealing agents of filter units for cleanrooms, sealing agents for construction, protective coatings for concrete and cement, glass cloth impregnating materials, processing aids for polyolefins, moldability improving additives for polyethylene, fuel containers of small generators and lawn mowers, and pre-coated metals prepared by primer-treating metal plates. Also, fabrics impregnated and sintered may be used as sheets or belts.

Specific examples of applications in the field of steel include sheet steel processing rolls of sheet steel processing equipment.

Specific examples of applications in the field of electrics include insulating oil caps of Shinkansen, venting seals of liquid-immersed transformers, seals of transformers, jackets of oil well cables, seals of ovens (e.g., electric furnaces), window frame seals of microwave ovens, seal materials used in bonding wedges and necks of CRTs, seal materials of halogen lamps, fixing agents for electric parts, seal materials for treating terminals of sheathed heaters, and seal materials used in insulating and damp-proofing treatment on wire terminals of electrical devices. The fiber-reinforced composite material or tape may also be used as a covering material for oil- and heat-resistant electric wires, highly heat-resistant electric wires, chemical-resistant electric wires, highly insulating electric wires, high voltage power lines, cables, electric wires used in geothermal power generation devices, and electric wires used around automobile engines. The fiber-reinforced composite material or tape may also be used as any of oil seals and shaft seals of cables for vehicles. The fiber-reinforced composite material or tape may also be used as any of electrically insulating materials (e.g., materials used for insulating spacers of electric devices, insulating tapes used at joints and ends of cables, and heat-shrinkable tubes) and materials for electric and electronic devices used in high-temperature atmosphere (e.g., lead wire materials for motors and electric wire materials used around high-temperature furnaces). The fiber-reinforced composite material or tape may also be used as any of sealing layers and protecting films (back sheets) of solar cells.

In the field of fuel cells, the fiber-reinforced composite material or tape may be used as, for example, any of seal materials between electrodes or between an electrode and a separator in polymer electrolyte fuel cells and phosphoric acid salt fuel cells, and seals, packings, and separators of pipes for hydrogen, oxygen, or generated water.

In the field of electronic parts, the fiber-reinforced composite material or tape may be used as, for example, any of heat-radiating materials, electromagnetic-wave-shielding materials, and gaskets for hard disk drives (magnetic recording devices) of computers. The fiber-reinforced composite material or tape may also be used as shock-absorbing rubbers (crash stoppers) of hard disk drives, binders for electrode active materials of nickel hydrogen secondary batteries, binders for active materials of lithium ion batteries, polymer electrolytes of lithium secondary batteries, binders for positive electrodes of alkaline storage batteries, binders for EL elements (electroluminescent elements), binders, seal materials, and sealing agents for electrode active materials of capacitors, covering materials for quartz of optical fibers, films and sheets such as covering materials for optical fibers, potting, coating, or bonding seals for electronic parts and circuit boards, fixing agents for electronic parts, modifiers for seal materials (e.g., epoxy compounds), coatings for printed circuit boards, modifiers for printed circuit board prepreg resins (e.g., epoxy compounds), scattering inhibitors for electric light bulbs, gaskets for computers, large computer cooling hoses, packings such as gaskets and O-rings for secondary batteries, especially lithium secondary batteries, sealing layers, connectors, and dampers covering one or both of outside surfaces of organic EL structures.

In the field of equipment for transporting chemicals, the fiber-reinforced composite material or tape may be used as, for example, any of safety valves and loading valves of trucks, trailers, tank trucks, and shipping.

In the field of parts of equipment for prospecting and mining energy sources such as petroleum and gas, the fiber-reinforced composite material or tape may be used as, for example, any of seal materials used in mining petroleum or natural gas and boots of electric connectors used in oil wells.

Specific examples of applications in the field of parts of equipment for prospecting and mining energy sources include drill bit seals, pressure-control diaphragms, seals of horizontal drilling motors (stators), stator bearing (shaft) seals, seal materials used in blowout preventers (BOP), seal materials used in rotary blowout preventers (pipe wipers), seal materials and gas-liquid connectors used in measurement while drilling systems (MWD), logging tool seals (e.g., O-rings, seals, packings, liquid-gas connectors, and boots) used in logging equipment, expandable packers and completion packers, and packer seals used therefor, seals and packings used in cementing devices, seals used in perforators (perforating devices), seals, packings, and motor linings used in mud pumps, covers of underground sound inspection devices, U-cups, composition seating cups, rotary seals, laminate elastomeric bearings, seals for flow control, seals for sand control, seals of safety valves, seals of hydraulic fracturing equipment, seals and packings of linear packers and linear hangers, seals and packings of well heads, seals and packings of chokes and valves, seal materials for logging while drilling (LWD) systems, diaphragms (e.g., diaphragms for feeding lubricants in petroleum mining pits) used in prospecting and mining petroleum, gate valves, electronic boots, and seal elements of perforating guns.

The fiber-reinforced composite material or tape may also be used as for example, any of joint seals in kitchens, bathrooms, and lavatories; fabrics of outdoor tents; seal materials for materials of stamps; rubber hoses for gas heat pumps and Freon-resistant rubber hoses; films, linings, and weather-resistant covers for agriculture; and tanks of laminated sheet steel used in the field of construction or home appliances.

The fiber-reinforced composite material or tape may also be used as an article bonded to a metal such as aluminum. Examples of such applications include door seals, gate valves, pendulum valves, and solenoid tips, as well as piston seals and diaphragms bonded to metal and metal rubber parts such as metal gaskets bonded to metal.

The fiber-reinforced composite material or tape of the invention may also be used as any of rubber parts, brake shoes, and brake pads of bicycles.

One exemplary form of the fiber-reinforced composite material or tape is a belt.

Examples of the belt include the following: power transmission belts (including flat belts, V-belts, V-ribbed belts, toothed belts), and transportation belts (conveyor belts) such as flat belts used for portions exposed to high temperatures, such as portions around engines of agricultural machinery, machine tools, and industrial machinery; conveyor belts for transporting scattered matters or particles of coal, smashed rock, earth and sand, ores, and wood chips at high temperatures; conveyor belts used in iron mills, such as blast furnaces; conveyor belts used for applications exposed to high temperatures in high precision machine assembling factories and food factories; V-belts and V-ribbed belts for agricultural machinery, general equipment (e.g., OA equipment, printers, dryers for business purposes), and automobiles; power transmission belts of transporting robots; toothed belts such as power transmission belts of food machinery and machine tools; and toothed belts for automobiles, OA equipment, medical uses, and printers.

In particular, timing belts are typical toothed belts for automobiles.

The above belt may have a single layer structure or a multi-layer structure.

In the case of a multi-layer structure, the belt may have the fiber-reinforced composite material or tape of the invention and a layer of another material.

Examples of the layer of another material in the multi-layer belt include layers formed from different rubber, layers formed from thermoplastic resin, fiber-reinforced layers, canvas layers, and metal foil layers.

The fiber-reinforced composite material or tape of the invention may also be used as damper pads for industrial use, damper mats, slab mats for railways, pads, and damper rubbers for automobiles. The damper rubbers for automobiles may be damper rubbers for engine mounts, motor mounts, member mounts, strut mounts, bushes, dampers, muffler hangers, and center bearings.

Examples of other applications include joint parts such as flexible joints and expansion joints, boots, and grommets. In the field of shipping, the fiber-reinforced composite material or tape may be used for marine pumps.

The joint parts are joints used for pipes and piping equipment, and are used for preventing vibrations and noises generated by piping systems, absorption of expansion and contraction or displacement due to temperature change and pressure change, absorption of dimensional changes, and mitigation or prevention of influences due to earthquakes or land subsidence.

The flexible joints and expansion joints may be preferably used as molded articles with complicated shapes for shipbuilding piping, piping of machinery such as pumps and compressors, chemical plant piping, electric piping, piping of civil engineering works and waterworks, and automobiles.

The boots may be preferably used as molded articles with complicated shapes, such as boots for various industries, including boots for automobiles (e.g., constant-velocity joint boots, dust covers, rack and pinion steering boots, pin boots, and piston boots), boots for agricultural machinery, boots for industrial vehicles, boots for construction machinery, boots for hydraulic machinery, boots for pneumatic machinery, boots for centralized lubrication systems, boots for liquid transportation, boots for firefighting, and boots for liquefied gas transportation.

The fiber-reinforced composite material or tape of the invention may also be used as any of diaphragms for filter presses, diaphragms for blowers, diaphragms for water supply, diaphragms for liquid storage tanks, diaphragms for pressure switches, diaphragms for accumulators, and diaphragms for air springs (e.g., suspensions).

The fiber-reinforced composite material or tape of the invention may also be used as a cushioning material for heat-press molding in production of decorative plywood, printed circuit boards, electrically insulated plates, and hard polyvinyl chloride laminates from melamine resin, phenol resin, or epoxy resin.

The fiber-reinforced composite material or tape of the invention may also contribute to give impermeability to various supporters such as sealing gaskets related to weapons and protective clothing against contact with invasive chemicals.

The fiber-reinforced composite material or tape of the invention may also be used as any of O-rings (square-rings), V-rings, X-rings, packings, gaskets, diaphragms, oil seals, bearing seals, lip seals, plunger seals, door seals, lip and face seals, gas delivery plate seals, wafer support seals, barrel seals, and other seal materials for sealing lubricants (engine oil, mission oil, gear oil), fuel oils, or greases (in particular, urea grease) containing amine additives (in particular, amine additives used as antioxidants, detergents, or dispersants) used in transports such as automobiles and shipping. The fiber-reinforced composite material or tape may also be used as any of tubes, hoses, rubber rolls, coatings, belts, and valve bodies of valves. The fiber-reinforced composite material or tape may also be used as any of laminating materials and lining materials.

The fiber-reinforced composite material or tape may also be used as any of covering materials for heat- and oil-resistant electric wires used as, for example, electric wires of sensors contacting transmission oil and/or engine oil in internal combustion engines of automobiles and detecting the oil temperature and/or the oil pressure, and may be used in high-temperature environment such as the inside of oil pans of automatic transmissions or engines.

Other examples of such applications include non-viscous oil-resistant rolls for copiers, weather-resistant freeze-preventive weather strips, rubber stoppers for infusion solution, vial rubber stoppers, release agents, non-viscous light-duty transport belts, adhesion-preventive coatings of pulley gaskets of automobile engine mounts, covering processing of synthetic fibers, and bolt parts or joints having a packing covering thin layer.

The applications of the fiber-reinforced composite material or tape of the invention with respect to the automobile-related parts include motorcycle parts having the same configurations.

Examples of the automobile-related fuels include light oil, gasoline, and fuels for diesel engines (including biodiesel fuel).

Use of the tape, laminate, pipe, riser pipe, or flowline in a high-temperature environment is also encompassed by the invention.

EXAMPLES

The invention will be described below referring to, but are not limited to, examples.

The parameters in the examples were determined by the following methods.

(Composition of Fluororesin)

The composition of the fluororesin was determined by $^{19}$F-NMR at a measurement temperature of melting point of the polymer+20° C. using a nuclear magnetic resonance device AC300 (Bruker-Biospin), appropriately in combination with elemental analysis in accordance with the integral values of the respective peaks and the types of the monomers.

(Melting Point (° C.) of Fluororesin)

The melting point was determined from the peak on an endothermic curve obtained by thermal analysis at a temperature-increasing rate of 10° C./min using a differential scanning calorimeter RDC220 (Seiko Instruments Inc.) in conformity with ASTM D-4591.

(Melt Flow Rate (MFR) of Fluororesin)

The MFR was defined as the mass (g/10 min) of a polymer flowing out of a nozzle (inner diameter: 2 mm, length 8 mm) per 10 minutes at 297° C. and a 5-kg load using a melt indexer (Toyo Seiki Seisaku-sho, Ltd.) in conformity with ASTM D3307-01.

EXAMPLES AND COMPARATIVE EXAMPLES

Films of the fluororesins shown in Table 1 were prepared.

TABLE 1

| | Composition | Melting point | MFR (g/10 min) (Set temperature) |
|---|---|---|---|
| Fluororesin (1) | Copolymer of TFE/VDF/CH$_2$=CHCF$_2$CF$_2$CF$_2$CF$_2$CF$_3$ 60.0/39.7/0.3 (mol %) | 215 | 2.1 (297° C.) |

TABLE 1-continued

| Composition | | Melting point | MFR (g/10 min) (Set temperature) |
|---|---|---|---|
| Fluororesin (2) | Ethylene/TFE copolymer | 255 | 6.0 (297° C.) |

A fluororesin film/a carbon fiber sheet/a fluororesin film are disposed in the given order, and the ratio (by mass) of the fluororesin and the carbon fiber was set within the range of 40:60 to 45:55. Heat-pressing was performed under the following conditions to give a fiber-reinforced composite material sheet. The fiber-reinforced composite material sheet had a thickness of 0.3 mm.

Carbon Fiber Sheet

CO6343 produced by Toray Industries, Inc. (warp: T300-3000, weft: T300-3000, plain weave, thickness: 0.25 mm, tensile strength of T300-3000: 3530 MPa, tensile modulus of T300-3000: 230 GPa)

CO6347B produced by Toray Industries, Inc. (warp: T300R-3000, weft: T300B-3000, plain weave, thickness: 0.23 mm, tensile strength of T300B-3000: 3530 MPa, tensile modulus of T300B-3000: 230 GPa)

TR3110M produced by Mitsubishi Rayon Co., Ltd. (warp: TR30S 3L, weft: TR30S 3L, plain weave, thickness: 0.23 mm, tensile strength of TR30S 3L: 4120 MPa, tensile modulus of TR30S 3L: 234 GPa)

W-3161 produced by Teijin Limited (warp: HTS40 3K, weft: HTS40 3K, plain weave, thickness: 0.25 mm, tensile strength of HTS40 3K: 4400 MPa, tensile modulus of HTS40 3K: 240 GPa)

Heat-Press Conditions
Press temperature: 350° C.
Heat retention time: 5 minutes
Pressing time: 10 minutes
Pressure: 2 MPa The maximum stress, the maximum elongation, and the tensile modulus of the fluororesin film and the resulting fiber-reinforced composite material were determined by a tensile test under the following conditions. Table 2 shows the results.

Tensile Test Conditions
Tension rate: 100 mm/min
Shape of sample: micro dumbbell

REFERENCE SIGNS LIST 1a, 1b, 1c: tape
2: central portion
3: thin portion
4: protrusion
5: thin portion
10: pipe
11: first layer
12: second layer
14, 15, 16: tape
20: pipe
21: first layer
22: second layer
23: third layer
30: riser pipe or flowline
31: body (carcass)
32: first layer
33: second layer
34: first reinforcing layer
35: second reinforcing layer
36: outer layer resin

The invention claimed is:

1. A fiber-reinforced composite material comprising a fluororesin and a reinforcing fiber,
the fluororesin containing a tetrafluoroethylene unit and a vinylidene fluoride unit,
the tetrafluoroethylene unit representing 55 to 95 mol % of all the monomer units constituting the fluororesin,
the vinylidene fluoride unit representing 45 to 5 mol % of all the monomer units constituting the fluororesin,
wherein the fiber-reinforced composite material has a maximum elongation of 1% or greater.

2. The fiber-reinforced composite material according to claim 1,

TABLE 2

| | | Fiber-reinforced composite material | | | | |
|---|---|---|---|---|---|---|
| Fluororesin | | Example 1 (1) | Comparative Example 1 (2) | Example 2 (1) | Example 3 (1) | Example 4 (1) |
| Carbon fiber sheet | | CO6343 (Toray) | CO6343 (Toray) | CO6347B (Toray) | TR3110M (Mitsubishi Rayon) | W-3161 (Teijin) |
| Maximum stress | MPa | 216 | 1 | 212 | 235 | 334 |
| Maximum elongation | % | 4.1 | 0.4 | 5.9 | 5.4 | 5.1 |
| Tensile modulus | MPa | 9588 | 283 | 4470 | 7189 | 9786 |

| | | Fluororesin film | |
|---|---|---|---|
| Fluororesin | | (1) | (2) |
| Maximum stress | MPa | 35 | 60 |
| Maximum elongation | % | 450 | 435 |
| Tensile modulus | MPa | 500 | 500 | wherein the fluororesin further contains at least one unit of an ethylenically unsaturated monomer selected from the group consisting of:

ethylenically unsaturated monomers represented by the following formula (1):

$$CX^{11}X^{12}=CX^{13}(CX^{14}X^{15})_{n11}X^{16}$$

wherein $X^{11}$ to $X^{16}$ are the same as or different from each other, and are each H, F, or Cl; and $n^{11}$ is an integer of 0 to 8, excluding tetrafluoroethylene and vinylidene fluoride; and ethylenically unsaturated monomers represented by the following formula (2):

$$CX^{21}X^{22}=CX^{23}-O(CX^{25}X^{25})_{n21}X^{26}$$

wherein $X^{21}$ to $X^{26}$ are the same as or different from each other, and are each H, F, or Cl; and $n^{21}$ is an integer of 0 to 8.

3. The fiber-reinforced composite material according to claim 1,
wherein the fluororesin and the reinforcing fiber have a mass ratio of 10:90 to 90:10.

4. The fiber-reinforced composite material according to claim 1,
wherein the fiber-reinforced composite material has a maximum stress of 50 MPa or greater.

5. The fiber-reinforced composite material according to claim 1,
wherein the fiber-reinforced composite material has a tensile modulus of 1000 MPa or greater.

6. The fiber-reinforced composite material according to claim 1,
wherein the reinforcing fiber is in the form of a sheet.

7. The fiber-reinforced composite material according to claim 1,
wherein the reinforcing fiber is a reinforcing fiber woven fabric.

8. The fiber-reinforced composite material according to claim 1,
wherein the reinforcing fiber is at least one selected from the group consisting of carbon fiber, glass fiber, basalt fiber, metal fiber, aramid fiber, polyethylene fiber, polyamide fiber, silicon carbide fiber, polyester fiber, ceramic fiber, alumina fiber, boron fiber, mineral fiber, rock fiber, slag fiber, plant fiber, polyoxymethylene fiber, aromatic polyamide fiber, polyparaphenylene benzobisoxazole fiber, cellulose fiber, and lignin fiber.

9. The fiber-reinforced composite material according to claim 1,
wherein the reinforcing fiber has a tensile modulus of 100 to 1000 GPa.

10. The fiber-reinforced composite material according to claim 1,
wherein the reinforcing fiber has a tensile strength of 2000 to 10000 MPa.

11. The fiber-reinforced composite material according to claim 1,
wherein the fiber-reinforced composite material is a tape.

12. The fiber-reinforced composite material according to claim 11,
wherein the tape has a band shape having flexibility that allows the tape to be coiled.

13. A pipe comprising:
a first layer; and
a second layer disposed on the first layer,
the second layer including the fiber-reinforced composite material according to claim 11,
the first layer and the second layer being stacked in the given order from the inside of the pipe,
the second layer being formed from the tape wrapped around the outer surface of the first layer.

14. A laminate comprising:
a first layer; and
a second layer disposed on the first layer,
the second layer including the fiber-reinforced composite material according to claim 1.

15. A pipe comprising the laminate according to claim 14.

16. The pipe according to claim 15,
wherein the first layer is a flexible tube.

17. A riser pipe comprising the pipe according to claim 15.

18. A flowline comprising the pipe according to claim 15.

19. The fiber-reinforced composite material according to claim 1,
wherein the reinforcing fiber comprises fibers having an average fiber length of 100 mm or longer.

* * * * *